(12) United States Patent
Khouaja et al.

(10) Patent No.: US 7,171,215 B2
(45) Date of Patent: Jan. 30, 2007

(54) TELECOMMUNICATION SYSTEM WITH CENTRALIZED MANAGEMENT

(75) Inventors: Youssef Khouaja, Cesson-Sevigne (FR); Philippe Bertin, Acigne (FR); Karine Guillouard, Chantepie (FR); Olivier Charles, Paris (FR)

(73) Assignee: France Telecom SA, Paris (FR)

( * ) Notice: Subject to any disclaimer, the term of this patent is extended or adjusted under 35 U.S.C. 154(b) by 0 days.

(21) Appl. No.: 10/496,903

(22) PCT Filed: Nov. 25, 2002

(86) PCT No.: PCT/FR02/04042

§ 371 (c)(1),
(2), (4) Date: Feb. 18, 2005

(87) PCT Pub. No.: WO03/047296

PCT Pub. Date: Jun. 5, 2003

(65) Prior Publication Data

US 2005/0147062 A1 Jul. 7, 2005

(30) Foreign Application Priority Data

Nov. 26, 2001 (FR) .................................. 01 15403

(51) Int. Cl.
*H04Q 7/20* (2006.01)
(52) U.S. Cl. .................. 455/452.2; 455/436; 455/517; 455/525; 455/432.1; 370/331; 370/352
(58) Field of Classification Search ............ 455/422.1, 455/436–445, 432.1, 435.2, 428, 451, 452.2, 455/517, 525, 67.11, 423; 370/331–332, 370/328, 338, 341, 352
See application file for complete search history.

(56) References Cited

U.S. PATENT DOCUMENTS

| | | | | |
|---|---|---|---|---|
| 5,608,780 A | * | 3/1997 | Gerszberg et al. | 455/436 |
| 5,845,211 A | * | 12/1998 | Roach, Jr. | 455/436 |
| 6,621,810 B1 | * | 9/2003 | Leung | 370/338 |
| 6,625,132 B1 | * | 9/2003 | Boettger et al. | 370/329 |
| 6,910,074 B1 | * | 6/2005 | Amin et al. | 709/227 |
| 6,970,708 B1 | * | 11/2005 | Raith | 455/440 |
| 6,985,732 B1 | * | 1/2006 | Ekman et al. | 455/436 |
| 7,095,728 B2 | * | 8/2006 | Desblancs et al. | 370/336 |
| 2002/0003789 A1 | * | 1/2002 | Kim et al. | 370/338 |
| 2002/0083197 A1 | * | 6/2002 | Jung et al. | 709/238 |
| 2004/0136392 A1 | * | 7/2004 | Diachina et al. | 370/431 |
| 2004/0240392 A1 | * | 12/2004 | Han | 370/331 |
| 2005/0261006 A1 | * | 11/2005 | Hirsbrunner et al. | 455/457 |

* cited by examiner

*Primary Examiner*—Erika A. Gary
*Assistant Examiner*—Kamaran Afshar
(74) *Attorney, Agent, or Firm*—Gerald E. Helget; Nelson R. Capes

(57) ABSTRACT

This invention concerns a telecommunication system SYST including: a mobile transmitter/receiver ERM, a number of access points PA1$i$ and PA2$j$, each capable of communicating with the mobile transmitter/receiver ERM situated in a coverage area ZA1$i$ or ZA2$j$ of the access point considered, and a communication network NW1 authorizing communications between said access points. The system according to the invention includes at least one mobility manager GM capable of determining, based on operating conditions of the access points, with which access point the mobile transmitter/receiver ERM should establish a communication. In the system according to the invention, a change in access point may not be carried out at the sole initiative of a mobile transmitter/receiver ERM, but is, on the contrary, carried out after analysis of an environment specific to said mobile transmitter/receiver ERM by the mobility manager GM.

14 Claims, 11 Drawing Sheets

BRQI

| SOT | SOL | PAID | PREF |
|---|---|---|---|
| PA NM ||||

FIG.14

HVRQ

| | | OT | OL |
|---|---|---|---|
| MODE | NPA | SEQN ||
| SOT | SOL | ID | QUAL |
| PAD ||||
| PAD | PAD | OT | OL |
| HOAD ||||

FIG.15

HVRT

| | | OT | OL |
|---|---|---|---|
| MODE | NPA | SEQN ||
| SOT | SOL | ID | PLEN |
| RAAD ||||
| PAD ||||

FIG.16

TELECOMMUNICATION SYSTEM WITH CENTRALIZED MANAGEMENT

This invention concerns a telecommunication system including:
  at least one mobile transmitter/receiver,
  a number of access points, each of which is capable of communicating with the mobile transmitter/receiver when said transmitter/receiver is situated in a coverage area of said access point, and
  a communication network allowing communications between said access points.

These types of systems are commonly used, for example, to carry out data transmissions according to an Internet protocol known by the name IP protocol. The access points then consist of base stations, and the communication network can be an Ethernet or Internet type network. In this type of telecommunication system, it is usually the mobile transmitter/receiver that chooses the access point with which it wishes to communicate. In general, once a mobile transmitter/receiver leaves the coverage area of an access point with which it is in communication to enter a coverage area of another access point, the transmitter/receiver connects spontaneously to this other access point, then called the new access point, without consulting this new access point concerning its capacity to accept this connection. This poses at least two types of problems:

On the one hand, it is possible that the new access point is already overloaded, that is, that it may already have problems ensuring a proper execution of communications in progress with all the mobile transmitters/receivers that are present in its coverage area and that are already connected to said new access point as a result of too many such transmitters/receivers, a situation that is known as saturation of the access point. An untimely connection of one or more additional transmitters/receivers will then only aggravate this situation and could be harmful to the integrity of all the communications in progress.

On the other hand, when a mobile transmitter/receiver connects spontaneously to a new access point, it can be inclined to change identifier and in return receive a new IP address, to repeat the example of the IP protocol cited above, so that, if a data exchange between the transmitter/receiver considered and a remote interlocutor is in progress at the time of this spontaneous connection, data may be lost, since it is intended to be transmitted to or received from an entity equipped with an identifier that has been made null and void by the spontaneous connection carried out in the meantime by the transmitter/receiver considered.

The aim of this invention is to eliminate these disadvantages to a large extent by proposing a telecommunication system in which a change in access point cannot, in principle, be executed at the sole initiative of a mobile transmitter/receiver, but is, on the contrary, executed after analysis of an environment specific to said mobile transmitter/receiver.

To this end, according to the invention, a telecommunication system that conforms to the introductory paragraph is characterized in that it also includes at least one mobility manager capable of identifying a specific access point with which the mobile transmitter/receiver is to establish a communication based on operating conditions of the access points.

In such a telecommunication system, the mobility manager is capable of determining, for a determined mobile transmitter/receiver, whether a change of access point is opportune or not, and what access point is best suited to serving as new access point for said transmitter/receiver, which limits the risks of saturation of said access points. If necessary, the manager may determine a new identifier to be attributed to the transmitter/receiver when it is connected to its new access point selected by the mobility manager. The mobility manager may be equipped with means for exerting control over the data being transmitted via the communication network, in which case the manager may also replace, for example in data being transmitted to the transmitter/receiver at the time the access point is changed, the old identifier of the transmitter/receiver considered with said new identifier, so that these data are not lost as in the known systems, but can be forwarded to said transmitter/receiver via its new access point.

To accomplish the functions attributed to it according to the invention, the mobility manager must collect information concerning the environment of each of the mobile transmitters/receivers present in the system, which represents a considerable workload.

Such environmental information may consist of geographic location information for a mobile transmitter/receiver, like an identification of the country, the city or geographic coordinates for the place where said mobile transmitter/receiver is located.

The environment information can also relate to a profile of a user of the mobile transmitter/receiver, and may, among other things, contain access authorization information defining access rights to certain access points based on the membership of this user in a particular group of users like, for example, a group of students, professors or visitors present on the same university campus. The environmental information related to a profile may also contain information representative of access restrictions to certain access points, for example to a given floor of a building housing corporate personnel.

The environmental information related to a profile may also contain information allowing a differentiation of access conditions based on different types of public networks used by the mobile transmitter/receiver to enter into communication with the telecommunication system according to the invention, for example, to authorize access via a local communication network made available to the user in an airport and, on the other hand, to prohibit access via a local communication network made available to the user in a hotel.

Thus, in certain modes of embodiment of the invention, the mobility manager may transmit information to the transmitter/receiver allowing said mobile transmitter/receiver to identify access points to which it may be authorized to connect. This type of information may be materialized by names of networks for which access is authorized, like PLMN (abbreviation of Public Land Mobile Network known to the person skilled in the art) for cellular networks, SSID identifiers (abbreviation for Service Set Identifier known to the person skilled in the art) for access points to local wireless networks, NAI (abbreviation of Network Address Identifier known to the person skilled in the art) for grid-type networks like the Internet, or even router prefixes for such grid-type networks.

In a variant of the invention, a mobile transmitter/receiver included in the system will be equipped with storage means intended to store a list of neighboring access points of the current access point when said transmitter/receiver is in communication with an access point called the current access point, which list has been transmitted to it by the manager.

The mobility manager may send this list various times to the mobile transmitter/receiver, and thus carry out updates, or only at the time of connection of the mobile transmitter/receiver to its current access point.

In this variant of the invention, the mobility manager may, after having conducted a succinct analysis of the environment of a mobile transmitter/receiver and having selected, as neighboring access points, access points to which the mobility manager deems that the mobile transmitter/receiver can be authorized to connect, send the list of these neighboring access points to said transmitter/receiver so that said transmitter/receiver can itself collect the information concerning these neighboring access points on behalf of the mobility manager. The mobile transmitter/receiver may thus be assigned a sensor function implemented remotely by the mobility manager, which will make it possible to distribute a substantial portion of the workload that would otherwise fall to the mobility manager according to the invention among the mobile transmitters/receivers. A mobile transmitter/receiver included in the telecommunication system according to the invention will advantageously be equipped with measuring means for taking at least one quality measurement of a communication that it might establish with at least one neighboring access point of its current access point.

Such measurements allow a mobile transmitter/receiver to monitor its environment, in principle by means of signal exchanges between the mobile transmitter/receiver and its neighboring access points. This type of monitoring can be done continuously, like mobile transmitters/receivers usually do with their current access points, but continuous monitoring risks uselessly mobilizing resources essential to the operation of the mobile transmitter/receiver, like, for example, a battery ensuring its power supply. Furthermore, frequent transmissions of reports to the mobility manager following a monitoring operation risks generating a considerable volume of communications that can disrupt the environment of the transmitter/receiver by causing a saturation of the access points. In a particular mode of embodiment of the measuring means, these means will be capable of being activated only when the quality of the communication between the mobile transmitter/receiver and the current access point is below a pre-determined reference threshold.

This makes it possible to ensure that a given mobile transmitter/receiver will trigger a monitoring operation only in situations where the results of such an operation have strong chances of being effectively exploited, since the weak quality of the communication between said mobile transmitter/receiver and its current access point signals a risk of an untimely interruption of said communication and may lead to a change in current access point.

In an advantageous mode of implementation of the measuring means, a reference threshold value is stored in the storage means of the mobile transmitter/receiver after it receives said value from the mobility manager.

This mode of implementation allows the mobility manager to exert control over the environmental monitoring operations carried out by the mobile transmitters/receivers, since it is the mobility manager that determines, through the choice of the threshold value, the level of communication quality that a mobile transmitter/receiver must consider as being acceptable, thus preventing any action by it if the quality of its communications is higher than this level. It is also possible for the mobility manager to assign different reference threshold values for different mobile transmitters/receivers, depending on the environment of each. In particular, the reference threshold value may be adjusted according to the volume of communications in progress in the corresponding geographic area and a service quality required for these communications.

In a particular mode of embodiment of the invention, a mobile transmitter/receiver included in the system will be equipped with means for sending a request, called a handover request, to the mobility manager in order to enter into communication with a neighboring access point of its current access point, when a quality measurement has established that a communication with a neighboring access point would be of a better quality that the communication with the current access point.

This mode of embodiment offers a mobile transmitter/receiver several possibilities after it has monitored its environment through quality measurements.

According to a first possibility, the mobile transmitter/receiver will be capable of itself analyzing the results of these measurements and of identifying a specific access point that appears to be an optimal new current access point. The mobile transmitter/receiver will then ask in its request for authorization to connect to this specific access point.

According to a second possibility, the mobile transmitter/receiver will be unable to analyze the quality measurements it has taken itself. It must then transmit these results to the mobility manager, preferably via the handover request, and leave it to the mobility manager to analyze them, the transmitter/receiver thus limiting itself to signaling through said handover request a need to be assigned a new access point.

The first possibility tends to give greater independence to mobile transmitters/receivers, which may allow a mobile transmitter/receiver to mitigate any deficiencies of the mobility manager, but encourages anarchical behavior on the part of the transmitters/receivers with the potential risks of saturation and loss of information cited earlier.

The second possibility offers the mobility manager greater control over the system; this manager will then advantageously be endowed with means for:

analyzing the results of the quality measurements taken by a mobile transmitter/receiver, deducing from this analysis and from the operating conditions of the access points and the interface devices the identity of a specific neighboring access point with which the transmitter/receiver must enter into communication, and transmitting said identity to said transmitter/receiver.

In a particular mode of embodiment of the invention, a telecommunication system as described earlier may advantageously include a database associated with the mobility manager and intended to contain information related to the operating conditions of the access points and the interface devices with which the mobility manager is linked.

This mode of embodiment is advantageous in that it prevents the mobility manager from itself storing too large a volume of information related, for example, to structures of the system that are in principle invariant or in any case subject to very infrequent variations, such as wiring modifications or additions or eliminations of interface and/or access points. The mobility manager may limit itself to managing dynamic information related to the instantaneous operating conditions of the system, although this type of information can also be stored in the database if it is suited to this purpose. The database also simplifies the management tasks that fall to the mobility manager by authorizing a centralized collection of information related to the operating conditions of the system.

In another mode of embodiment, we can plan to insert interface devices between the access points and the communication network, each interface device being capable of communicating with a pre-determined group of access points.

The interface devices, for example interfaces with at least one access router in connection with data transmissions according to the IP protocol, make it possible to organize the communications locally between access points, which reduces the workload of a management infrastructure of the communication network and in particular the workload of the mobility manager, which can transmit mobility information to the interface devices, making them responsible for passing along said information concerning the access points.

In order to further simplify the management of the system by reducing the number of information paths possible between the transmitters/receivers and the interface devices, we can make each access point capable of communicating with a single interface device.

In order to simplify the physical embodiment of the system according to the invention by using pre-existing resources and/or geographic sites, we can also plan to install the mobility manager in at least one interface device. The mobility manager can also be fragmented into sub-units distributed in different interface devices.

The invention also concerns, as essential means to its implementation, a device capable of carrying out the functions of a transmitter/receiver included in a telecommunication system as described earlier, for example a radiotelephone, an organizer or a portable computer equipped with transmission/reception functionalities or even a unit formed by a radiotelephone and an organizer or a portable computer capable of communicating among themselves.

The invention also concerns, as essential means for its implementation, a device capable of carrying out the functions of a mobility manager included in a telecommunication system as described earlier, for example, a server.

The invention also concerns a data transmission process between:

at least one mobile transmitter/receiver, a number of access points, each of which is capable of communicating with the mobile transmitter/receiver when said transmitter/receiver is situated in a coverage area of said access point, and a communication network authorizing communications between said access points, a method characterized in that it includes at least one identification step based on operating conditions of the access points, of a specific access point with which the mobile transmitter/receiver must establish a communication.

In one of its modes of implementation, this method may include a storage step by the mobile transmitter/receiver, when it is in communication with an access point called the current access point, of a list of neighboring access points of the current point, which list is transmitted to it by the mobility manager.

This method will advantageously include a step for creating a list of neighboring access points by the mobility manager, which list is established based on environmental information specific to the mobile transmitter/receiver for which said list is intended.

The environmental information specific to the mobile transmitter/receiver may, among other things, be representative of profiles that conform to the following list:

membership of a user of the transmitter/receiver in a pre-determined group of users, and access authorization to at least one pre-determined access point granted to said group, prior acquisition by the user of authorizations to communicate with different access points linked to communication systems of different kinds, or geographic location of a user of the transmitter/receiver in a pre-determined area, and authorization to access at least one predetermined access point reserved for said area.

In an advantageous mode of implementation of this method, the quality measuring step will be carried out only when the quality of the communication between the mobile transmitter/receiver and the current access point is below a pre-determined reference threshold.

This method may also include a step during which the mobile transmitter/receiver stores a reference threshold value after said transmitter/receiver receives said value from the mobility manager.

In a particular mode of implementation of the invention, a method as described above may also include a step for the transmission of a handover request by the mobile transmitter/receiver to the mobility manager for the purposes of establishing a communication of said transmitter/receiver with a neighboring access point of its current access point when a quality measurement has established that a communication with this neighboring point would be of better quality than the communication with the current access point.

In a preferred mode of implementation of this method, the identification step may include, to be executed by the mobility manager:

a sub-step involving the analysis of said results, a sub-step involving the deduction from this analysis and the operating conditions of the access points of the identity of a specific neighboring access point with which the transmitter/receiver must enter into communication, and a sub-step involving the transmission of said identity to the transmitter/receiver.

Finally, the invention concerns, as useful element to the implementation of the method described above, a signal intended to be transmitted by a mobile transmitter/receiver to a mobility manager and including at least one result of a quality measurement of at least one communication that said mobile transmitter/receiver could establish with a neighboring access point of its current access point.

The features of the invention mentioned above along with others will become clearer upon reading the following description of an example of embodiment, said description being given in relation to the appended drawings in which:

FIG. 1 is a block diagram describing a telecommunication system according to a mode of implementation of the invention, FIG. 2 is a block diagram describing the operation of this type of telecommunication system in a first scenario, FIG. 3 is a block diagram describing the operation of this type of telecommunication system in a second scenario, FIG. 4 is a flow chart describing a method for transmitting data implemented in this type of system, FIG. 5 is a schematic representation of a signal forming a handover request intended to be transmitted by a transmitter/receiver present in this type of system, and FIG. 6 is a schematic representation of a signal intended to be transmitted by a mobility manager in response to such a handover request.

FIG. 14 is a schematic representation of a format that can be used by a type of information packet BRQI.

FIG. 15 is a schematic representation of a format that can be used by a type of information packet HVRQ.

FIG. 16 is a schematic representation of a format that can be used by a type of information packet HVRT.

Figure 1:
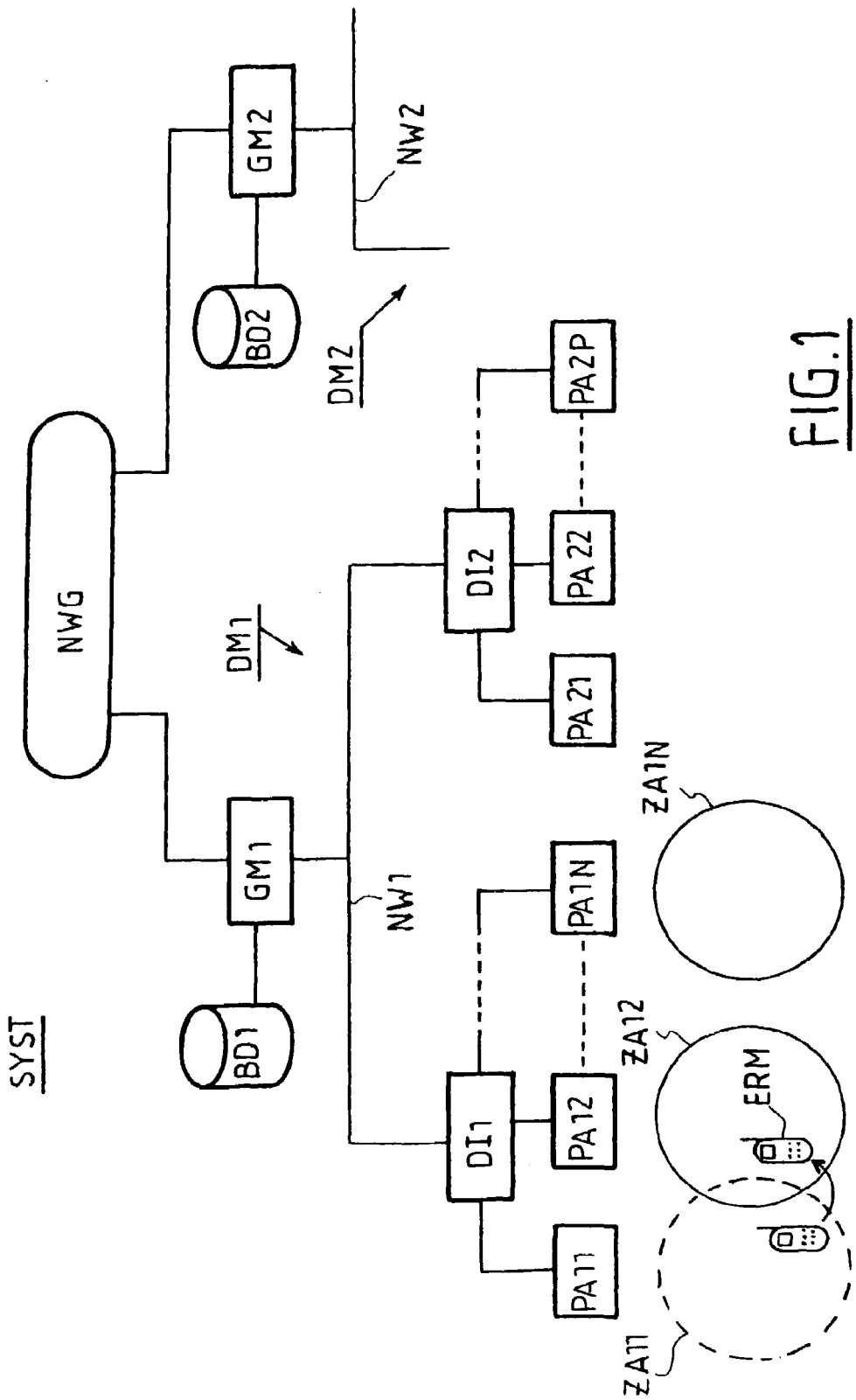
FIG. 1 is a schematic representation of a telecommunication system SYST that includes.

at least one mobile transmitter/receiver ERM, in this example a radiotelephone, a number of access points PA1$i$ and PA2$j$ (for i=1 to N and j=1 to P), each of which is capable of communicating with the mobile transmitter/receiver ERM when said transmitter/receiver ERM is situated in a coverage area ZA1$i$ or ZA2$j$ of said access point PA1$i$ or PA2$j$, at least two interface devices DI1 and DI2, each of which is capable of communicating, via an Ethernet link, for example, with a pre-determined group of access points PA1$i$ and PA2$j$, respectively, which access points may conform to the standard IEEE 802.11, and a communication network NW1 allowing communications between said interface devices DI1 and DI2.

This type of system may be used to carry out data transmissions between the mobile transmitter/receiver ERM and an Internet network NWG or another mobile transmitter/receiver present in the system SYST. The interface devices DI1 and DI2 may consist of access router interfaces commonly used in Internet network architectures and communicate between themselves via Internet or Ethernet links.

These interface devices DI1 and DI2 may also consist of access bridge interfaces to networks of different kinds, the interface device DI1 being, for example, embodied by an access bridge to a mobile radiotelephony network, and the interface device DI2 being embodied by an access bridge to a local network.

In other modes of embodiment of the invention, these interface devices may be absent, the access points then communicating directly between themselves via a communication network NW1, for example of the Ethernet type. The system SYST according to the mode of embodiment described here also includes a mobility manager GM1 capable of identifying, based on operating conditions of the access points PA1$i$ and PA2$j$ (for i=1 to N and j=1 to P), a specific access point with which the mobile transmitter/receiver ERM must establish a communication.

In this telecommunication system SYST, when, for example, the mobile transmitter/receiver ERM passes from one coverage area ZA11 to another coverage area ZA12, the mobility manager GM1 is capable of determining whether or not a change of access point for the mobile transmitter/receiver ERM is advisable, and what access point is best suited to serving as new access point for said transmitter/receiver ERM. The control thus exerted by the mobility manager GM1 limits the risks of saturation of the access points PA1$i$ and PA2$j$ (for i=1 to N and j=1 to P). The mobility manager GM1 determines whether it is necessary to assign a new identifier to the mobile transmitter/receiver ERM when it is connected to its new access point selected by the mobility manager GM1, which manager can also replace, for example, within data being transmitted to the transmitter/receiver ERM at the time of the change of access point, the old identifier of the transmitter/receiver ERM with said new identifier, so that these data are not lost as in known systems, but can be forwarded to said transmitter/receiver ERM via its new access point PA12. According to the existing IP protocols, this type of change of identifier takes place, for example, when the old and the new current access points depend on two different interface devices.

In the mode of embodiment represented here, the telecommunication system SYST includes a database BD1 associated with the mobility manager GM1 and intended to contain information related to the operating conditions of the access points PA1$i$ and PA2$j$ (for i=1 to N and j=1 to P) and the interface devices DI1 and DI2 with which the mobility manager GM1 is linked. The presence of the database BD1 prevents the mobility manager GM1 from itself storing too large a volume of information, relating, for example, to the structures of the system SYST, which are in principle invariant or in any case subject to very infrequent variations, like wiring modifications or additions or eliminations of interface devices and/or of access points. The mobility manager GM1 can limit itself to managing dynamic information relating to the instantaneous operating conditions of the system, although this type of information can also be stored in the database BD1 if it is so suited. The database BD1 also simplifies the management tasks that fall to the mobility manager GM1 by authorizing a centralized collection of information relating to the operating conditions of the system SYST.

In order to further simplify the management of the system SYST by reducing the number of possible information paths between a transmitter/receiver ERM and an interface device DI1 or DI2, each access point PA1$i$ or PA2$j$ (for i=1 to N and j=1 to P) is, in this example, only able to communicate with a single interface device DI1 or DI2.

The mobility manager GM1, the interface devices DI1 and DI2 and the access points PA1$i$ and PA2$j$ (for i=1 to N and j=1 to P) form a first mobility domain DM1 in which a mobile transmitter/receiver ERM is capable of moving. A telecommunication system SYST according to the invention may include, as is the case here, a first and a second mobility domain [D]M1 and [D]M2, respectively, capable of communicating with one another via the communication network NWG, each of the mobility managers GM1 and GM2 being equipped with a database BD1 and BD2 and controlling interface devices connected to one another by networks NW1 and NW2. The transmitter/receiver may switch from one mobility domain to the other, for example, by leaving a current access point belonging to the first mobility domain DM1 and by connecting to a new access point belonging to the second mobility domain DM2. The procedure for executing this domain change will be similar to the one used according to the invention to execute a current access point change within the same mobility domain, except that the data intended for the mobile transmitter/receiver being transmitted at the time of the change of access point must be redirected by the mobility manager of the domain to which the old access point belongs to the new current access point, potentially via the mobility manager of the mobility domain to which this new current access point belongs.

Figure 2:
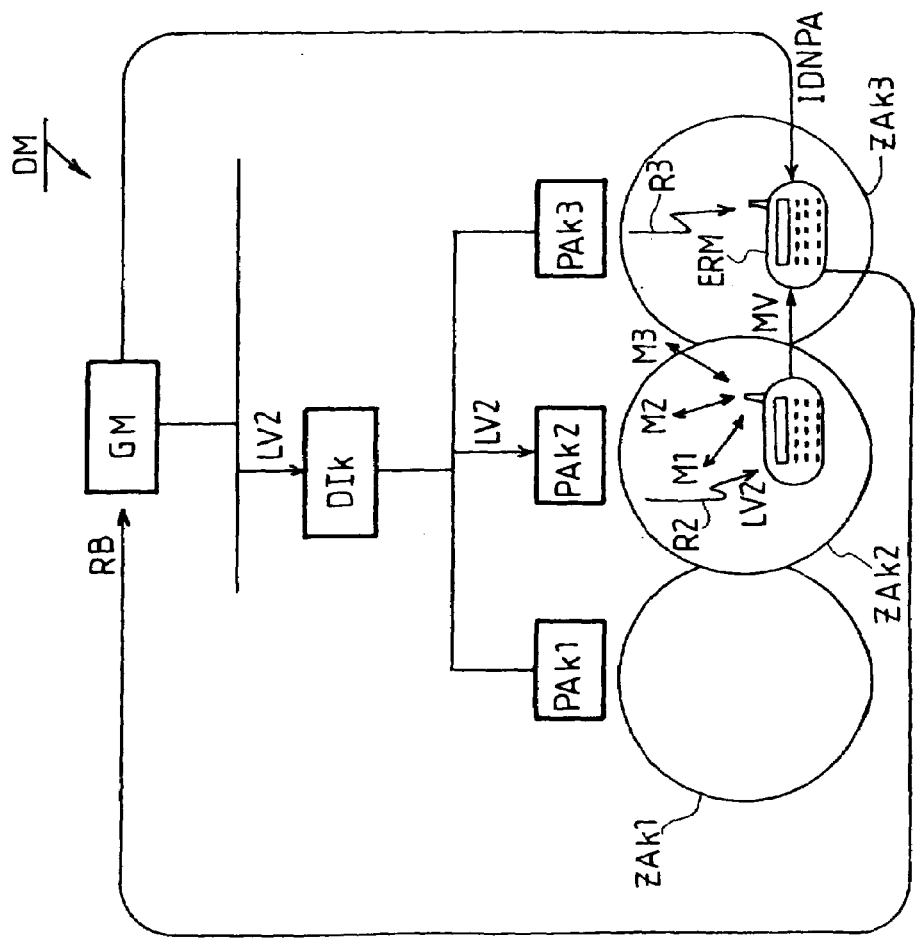

FIG. 2 represents more specifically a mobility domain DM in order to illustrate the operation of the telecommunication system according to the invention. This mobility domain DM includes a mobility manager GM, a number of interface devices DIk (for k=1 to M), one of which is represented here, and first, second and third access points PAk1, PAk2 and PAk3 intended to communicate with the interface device DIk. To these access points correspond respectively first, second and third coverage areas ZAk1, ZAk2 and ZAk3. A mobile transmitter/receiver ERM included in the system, consisting in this example of an organizer equipped with transmission/reception functions, is capable of moving in the mobility domain DM. We will assume that the mobile transmitter/receiver ERM is initially located in the second coverage area ZAk2 and is connected to the second access point PAk2, which means that the transmitter/receiver ERM has as current access point said access point PAk2. The mobility manager GM then sends to the mobile transmitter/receiver ERM via the interface device DIk and the current access point PAk2 a list LV2 of neighboring access points of said current access point PAk2. This list LV2 can be established by the mobility manager based on geographic proximity criteria, that is, the access points whose coverage areas are adjacent to the coverage area of the current access point may appear on this list. However, if the mobility manager GM establishes that certain of these access points are already saturated or if their operating conditions are close to saturation, it may choose not to include these access points in the list of neighboring access points to be sent to the mobile transmitter/receiver ERM. Furthermore, the mobility manager GM may know, through its general knowledge of the operating conditions of all the access points and interface devices included in the mobility domain DM, that other access points than those whose coverage areas are adjacent to the coverage area of the current access point could, due to their special properties, like, for example, greater transmitting power or greater availability, be acceptable candidates for a change of the current access point. The mobility manager may include these access points in the list of neighboring access points to be sent to the mobile transmitter/receiver ERM.

The list of neighboring access points LV2 having been transmitted, for example via a radio link R2, by the current access point PAk2 to the mobile transmitter/receiver ERM, this list is saved by the mobile transmitter/receiver ERM. In the example described here, we will assume that the list of neighboring access points LV2 includes the access points PAk1 and PAk3 whose coverage areas ZAk1 and ZAk3 are adjacent to the coverage area ZAk2 of the current access point PAk2. The mobile transmitter/receiver ERM is equipped with measuring means for taking quality measurements M1, M3 of communications that it could establish with said neighboring access points PAk1 and PAk3. This quality measurement M1 or M3 will be taken, in the example described here, by transmission of a radio signal to a neighboring access point PAk1 or PAk3 and reception, integrity check and measurement of a signal-to-noise ratio of a signal transmitted in return by said neighboring access point. In other possible modes of embodiment, the transmitter/receiver ERM may measure signal-to-noise ratios of specific signals transmitted continuously for this purpose by the access points PAk1, PAk2 and PAk3.

The quality measurements M1 and M3 allow the mobile transmitter/receiver ERM to monitor its environment. This monitoring may be continuous so that the mobile transmitter/receiver ERM routinely measures the quality M2 of the communication it establishes with its current access point PAk2, however, continuous monitoring risks unnecessarily mobilizing essential resources for the operation of the transmitter/receiver ERM, like, for example, a battery ensuring its power supply. Furthermore, frequent report transmissions to the mobility manager GM following monitoring operations risks generating a considerable volume of communications that could saturate the access points. The measuring means will, advantageously, be activated only when the quality of the communication between the mobile transmitter/receiver ERM and its current access point PAk2 drops below a pre-determined reference threshold. This makes it possible to ensure that the mobile transmitter/receiver ERM triggers a monitoring operation only in situations where the results of this operation have strong chances of being used effectively, since poor communication quality between said mobile transmitter/receiver ERM and its current access point PAk2 indicates a risk of untimely interruption of said communication and should lead to a change in current access point. The value of the reference threshold may have been determined by the mobility manager GM and communicated to the mobile transmitter/receiver ERM at the same time as the list LV2 of neighboring access points. This allows the mobility manager GM to exert control over the environmental monitoring operations carried out by the mobile transmitters/receivers, since it is the mobility manager GM that determines, through the selection of the threshold value, the level of communication quality that a mobile transmitter/receiver must consider acceptable, thus preventing any action on its part if the quality of its communications is higher than this level. It is also possible for the mobility manager GM to allocate different reference threshold values to different mobile transmitters/receivers based on each one's environment. In particular, the value of a reference threshold may be adjusted according to the volume of communications in progress in the corresponding geographic area and a required quality of service for these communications. For example, the transmission of a video flow equipped with an IP identification that defines it as such must have a quality justifying a priority processing of said flow compared to other communications in progress in the area considered, which may lead the mobility manager GM to notify the transmitters/receivers maintaining these lower priority communications with the corresponding access point to change the current access point.

In the example represented here, the mobile transmitter/receiver ERM accomplishes a move MV that causes it to leave the second coverage area ZAk2, which is the coverage area of its current access point PAk2, to enter the third coverage area ZAk3. During this move, the communication quality it maintains with its current access point PAk2, which it measures continuously through a measurement M2, drops below the predetermined reference threshold. The mobile transmitter/receiver ERM thus takes quality measurements M1 and M3 of communications it could establish with the access points appearing on the list LV2 of neighboring access points sent to it by the mobility manager GM. The mobile transmitter/receiver ERM is equipped with means for sending a request RB, called handover request, to the mobility manager GM in order to enter into communication with a neighboring access point of its current access point when a quality measurement has established that a communication with this neighboring access point would be of better quality than the communication with the current access point. In a first variant of the mode of embodiment of the invention described here, the mobile transmitter/receiver ERM will be capable itself of analyzing the results of these quality measurements M1, M3 and of identifying a specific access point PAk1 or PAk3 that appears able to constitute a optimal new current access point. The mobile transmitter/receiver ERM will then ask in its handover request RB for authorization to connect to this particular access point PAk1 or PAk3 by specifically mentioning it as the best choice for the handover requested.

In a second variant, the mobile transmitter/receiver ERM will be unable itself to analyze the results of the quality measurements M1, M3 that it has taken. It must then transmit these results to the mobility manager GM, preferably via the handover request RB, and leave it to the mobility manager GM to analyze these results, the transmitter/receiver ERM thus limiting itself to indicating through said handover request RB a need to be allocated a new access point.

The first variant tends to give mobile transmitters/receivers greater independence, which may allow a mobile transmitter/receiver ERM to offset any deficiencies of the mobility manager GM, but favors anarchical behavior on the part of the transmitters/receivers with the potential risks of saturation and loss of information cited earlier. In particular, the transmitter/receiver may have stored a second threshold value, called critical value, that is lower than the reference threshold value, and be equipped with means for connecting spontaneously when the quality of the communication in progress drops below this critical value, to the access point that the mobile transmitter/receiver has identified as best new current access point based on the quality measurements taken.

The second variant offers the mobility manager GM greater control over the system. It is, nevertheless, possible to leave the transmitter/receiver the option, in case of any deficiency of the mobility manager and if the quality of the communication it maintains with its current access point drops below a second threshold beyond which the communication will almost certainly be interrupted, to try to connect to a neighboring access point of its current point selected arbitrarily from the list of neighboring access points, for example, the one that appears first on said list, in order leave a chance of not losing data transmitted during the communication in progress.

According to the second variant, the manager GM is preferably equipped with means for:

analyzing the results of the quality measurements M1 and M3 taken by the mobile transmitter/receiver ERM, deducing from this analysis and from the operating conditions of the access points PAk1, PAk2 and PAk3 and from the interface devices DIk the identity of a neighboring access point with which the transmitter/receiver must enter into communication, for example the third access point PAk3 in coverage area ZAk3 in which the mobile transmitter/receiver ERM is located, and transmitting to said transmitter/receiver ERM the identity of said access point PAk3 via an identification signal IDNPA.

After having received the identification signal IDNPA, which may also include a new list of neighboring access points of its new current access points, the mobile transmitter/receiver ERM will reconfigure its transmission/reception means, that is, for example, it will modify the carrier frequencies of the signals it is supposed to transmit and receive in order to enter into contact with its new current access point PAk3 via a corresponding radio link R3. In the first scenario described here, the old current access point PAk2 and the new current access point PAk3 depend on the same interface device DIk. This implies, in accordance with known IP protocols, that this change in current access point will not result in any change in identifier, that is, in IP address, for the mobile transmitter/receiver ERM. If, for example, the new access point is on the edge of the mobility domain DM, the new list of neighboring access points may include access points belonging to a mobility domain adjacent to the mobility domain DM.

Figure 3:
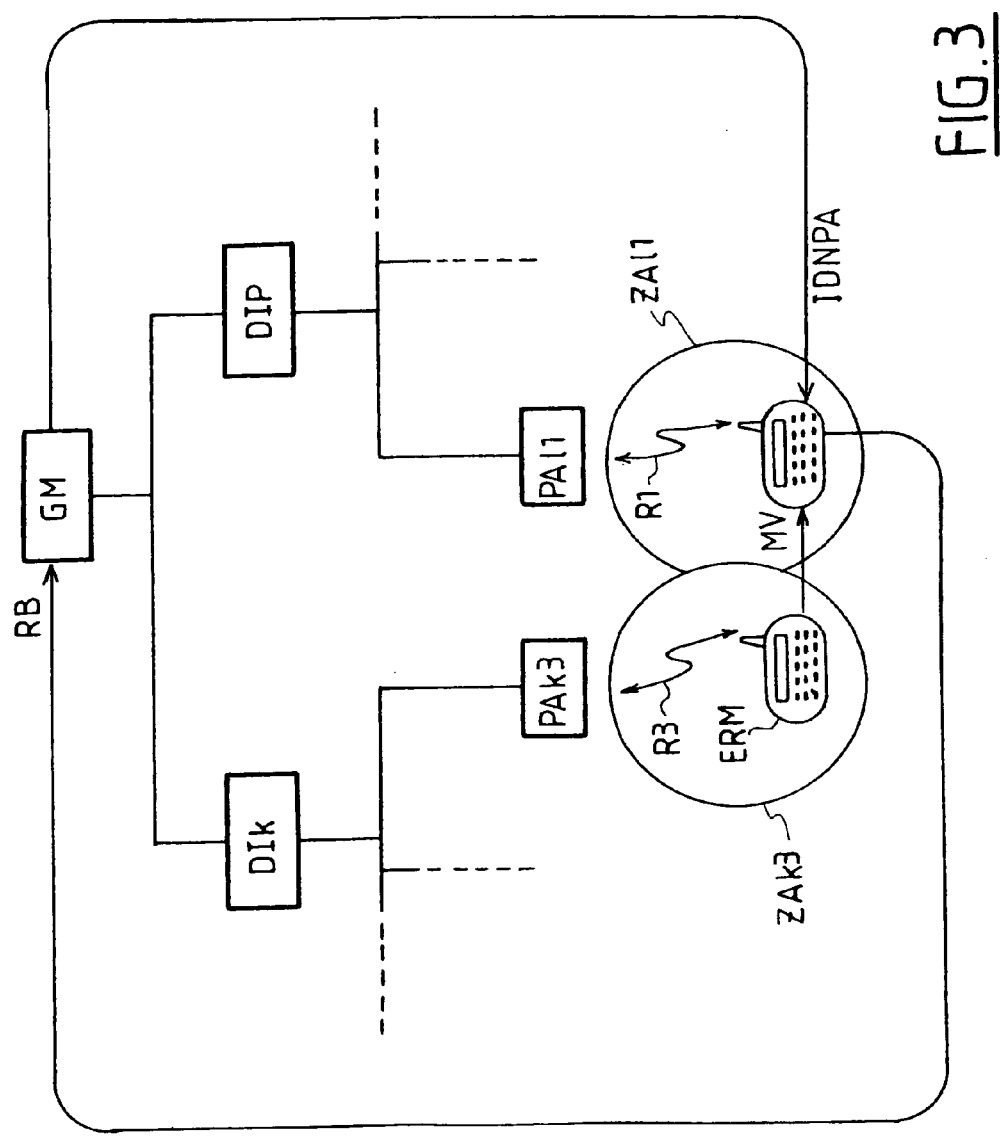

FIG. 3 illustrates a change in current access point in the system described above in a second scenario where the transmitter/receiver ERM undergoes a movement MV that causes it to leave the coverage area ZAk3 of a given current access point PAk3 to enter a coverage area ZA11 of a new current access point PA11, which access points PAk3 and PA11 depend on two distinct interface devices, DIk and DI1. In this second scenario, as in the previous one, the transmitter/receiver ERM will be led to transmit a handover request RB to the mobility manager GM in response to which the mobility manager GM will send an identification signal IDNPA to said transmitter/receiver ERM that will contain, implicitly or explicitly, the identity of the new access point PA11 and, in this second scenario, a new identifier attributed to the mobile transmitter/receiver, since this new access point PA11 depends on a new interface device DI1. The mobile transmitter/receiver ERM will then reconfigure its transmission/reception means, that is, for example, it will modify the carrier frequencies of the signals it is supposed to transmit and receive in order to enter into contact with its new current access point PA11 via a corresponding radio link R1, and will acknowledge receipt of its new identifier to the mobility manager GM via this radio link R1. The mobility manager GM may then, in an advantageous mode of implementation of the invention, intercept all the data packets being transmitted to the old identifier of the transmitter/receiver ERM and replace this old identifier with the new identifier of said transmitter/receiver ERM in order to minimize the information losses caused by the change in current access point of the transmitter/receiver ERM.

Figure 4:
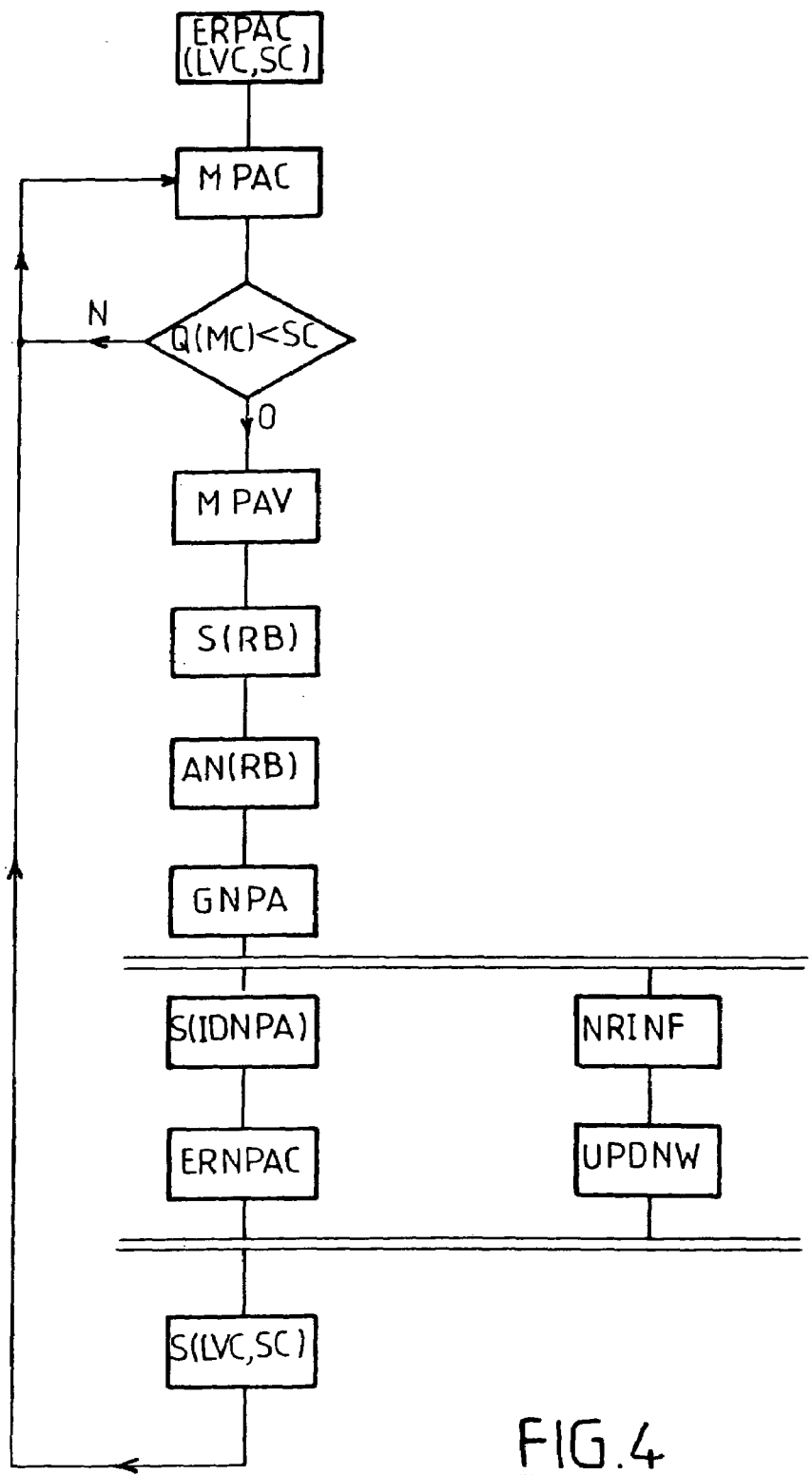

FIG. 4 is a flow chart that illustrates a data transmission process according to a mode of implementation of the invention. In an initial step ERPAC of this process, a mobile transmitter/receiver included in a telecommunication system as described above is in communication with an access point called current access point. Said transmitter/receiver then received from a mobility manager and saved in storage means a list LVC of neighboring access points of said current access point, as well as a reference threshold value SC beyond which the quality of the communication that the transmitter/receiver maintains which its current access point must not be durably situated. In a next step MPAC, the transmitter/receiver measures the quality of the communication it maintains with its current access point. A next test step Q(MC)<SC determines whether the quality value measured for this communication is lower than the value of the reference threshold. If the test step Q(MC)<SC result is negative, the transmitter/receiver takes another measurement of the quality of the communication that it maintains with its current access point in a new MPAC step. If the test step Q(MC)<SC produces a positive result, during the next step MPAV the transmitter/receiver measures the quality of communications it could establish with the access points present on the list of neighboring access points it has saved. During a next step S(RB), the transmitter/receiver sends a handover request RB to the mobility manager, since the result of the test indicates a need to change current access points. The handover request may preferably include the results of the quality measurements taken by the transmitter/receiver. During a next step AN(RB), the mobility manager analyzes the handover request RB and potentially the results of the quality measurements it includes, in correspondence with the data relating to the operating conditions of the access points and of the interface devices that are placed under the control of said mobility manager, which deduces from them, during a next step GNPA, the identity of the neighboring access points that has the most advantageous characteristics for serving as new current access point for the transmitter/receiver.

In this particular mode of implementation of the invention, two series of actions are then carried out at the same time:

In a first step S(IDNPA) of a first series of actions, the mobility manager sends the identity of the access point that is to become its new current access point to the transmitter/receiver. In a next step ERNPAC of this first series of actions, the transmitter/receiver acknowledges receipt of this identity by connecting to the access point designated by the mobility manager as its new current access point.

In a first step NRINF of a second series of actions, the mobility manager generates new routing information, that is, for example, a new destination address that must correspond to the transmitter/receiver when it is connected to the new current access point whose identity the mobility manager has communicated to said transmitter/receiver. This new address will form a new identifier for said transmitter/receiver. In a next step UPDNW of this second series of actions, the mobility manager communicates to all the interface devices and all the access points it controls the new identifier of the transmitter/receiver concerned, so that information that may have been in transmission to said transmitter/receiver before its change in current access point can be transmitted to said transmitter/receiver via its new current access point. In a variant of this step UPDNW, the mobility manager may intercept all the information being transmitted having as destination address the old identifier of the transmitter/receiver concerned, and, on the one hand, redirect it by attributing to it as destination address the new identifier of the transmitter/receiver concerned, and, on the other hand, continue to route a copy of said information to the old address for a pre-determined interval of time, which will make it possible to reduce considerably the risks of this information being lost as a result of the change in current access point.

The first and second series of actions described above converge toward a next step S(LVC,SC) during which the mobility manager sends to the transmitter/receiver, after having analyzed the operating conditions of all the access points and interface devices over which the mobility manager has control, a new reference threshold value SC and a new list LVC of neighboring access points of the new current access point of said transmitter/receiver, which can then, during a next step MPAC, begin to measure the quality of the communication it maintains with its new access point.

Figure 5:
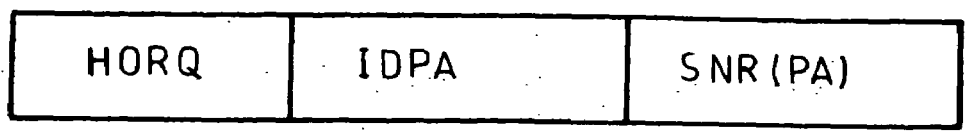

FIG. 5 is a schematic representation of a signal that may constitute a handover request RB according to a particular mode of implementation of the invention. This handover request RB takes the form of a packet of information including a first field HORQ intended to identify the nature of the packet, in this case a request from the transmitter/receiver for the purposes of changing its current access point. The handover request RB contains a second field IDPA containing an identifier of a neighboring access point of the current access point of the transmitter/receiver. The handover request RB contains a third field SNR(PA) containing a signal-to-noise ratio resulting from a measurement of a communication that the transmitter/receiver could establish with the neighboring access point identified in the second field IDPA. The handover request RB may contain a number of field couples of the type of the second and third fields less than or equal to the number of access points present in the list of neighboring access points that the transmitter/receiver has received from the mobility manager.

Figure 6:
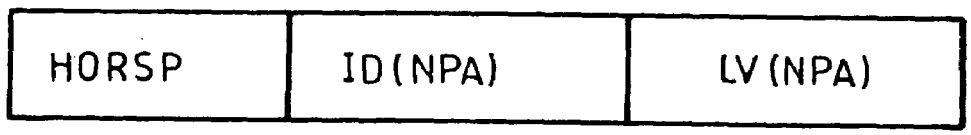

FIG. 6 is a schematic representation of a structure that can be attributed to an identification signal IDNPA intended to be sent by the mobility manager to a transmitter/receiver in response to a handover request RB transmitted by this transmitter/receiver. This identification signal IDNPA takes the form of a packet of information including a first field HORSP intended to identify the nature of the packet, in this case a response to a handover request. The identification signal IDNPA contains a second field ID(NPA) containing an identifier of the access point selected by the mobility manager to constitute the new access point NPA of the transmitter/receiver that transmitted the handover request. This identifier may be given explicitly by the mobility manager, i.e., for example in the form of a new IP address, or implicitly, that is, in the form of a set of data allowing the transmitter/receiver for which the identification signal IDNPA is intended to reconstruct its new IP address. In this example, the identification signal IDNPA contains a third field LV(NPA) representative of a list of neighboring access points of the access point defined in the second field ID(NPA) so that the transmitter/receiver is capable of immediately commencing monitoring operations for its new environment.

Appendix

The description that will follow is a specific application example of the invention in which a telecommunication system as described previously is intended to perform data transmissions in accordance with the general instructions of an HMIPv6 (Hierarchical Mobile Internet Protocol version 6) Internet protocol available from the "IETF Mobile IP Working Group." This description cannot in any case restrict the scope of the claims cited hereinbelow, and must be read in correspondence with FIG. 7 to FIG. 20.

FIGS. 7 to 12 illustrate general principles underlying the HMIPv6 protocol mentioned above and a telecommunication system used to implement this protocol.

Figure 7:
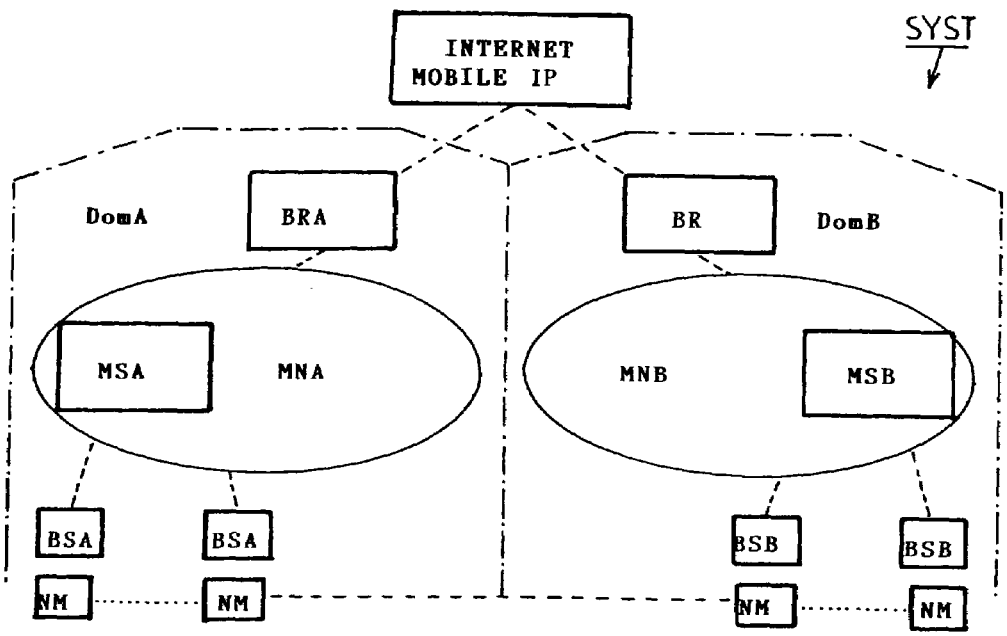
FIG. 7 is a diagram of a telecommunication system that includes an Internet network managed by a Mobile IP protocol, and mobility domains that connect the domain to the rest of the Internet network and serves a mobility network.

FIG. 7 represents this type of telecommunication system SYST that includes an Internet network managed by a Mobile IP protocol, two mobility domains DomA and DomB, each equipped with at least one border router BRA or BRB each intended to connect a domain to the rest of the Internet network and serving a mobility network MNA or MNB, for example of the LAN type, including mobility servers MSA or MSB, each of which forms a router of the mobility network and is intended to communicate with a group of base stations BSA or BSB. A mobile node NM equivalent to a mobile transmitter/receiver according to the preceding description, is capable of moving in a geographic area corresponding to the mobility domains DomA and DomB. The base stations BSA and BSB thus form access routers to the mobile node NM.

FIGS. 8 to 12 summarily describe essential aspects of the HMIPv6 protocol.

Figure 8:
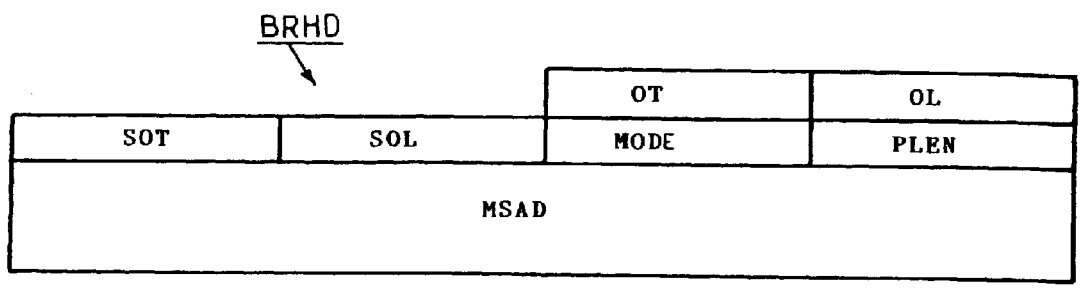
FIG. 8 is a schematic representation of a format required by an "association request" destination option header BRHD of an information message transmitted by a mobility server to the access routers of its domain in accordance with HMIPv6 protocol.

FIG. 8 is a schematic representation of a format required by an "association request" destination option header BRHD of an information message transmitted by a mobility server to the access routers of its domain in accordance with the HMIPv6 protocol. An OT (acronym of the expression Option Type known by the person skilled in the art) field with a length of one byte, takes a value equal to 8 and thus indicates that the option is an "association request" option (known by the person skilled in the art as a Binding Request). An OL (acronym of the expression Option Length known to the person skilled in the art) field with a length of one byte, takes a value equal to 20 and thus announces the length of the option in bytes without counting the first two fields. An SOT (acronym for the expression Sub-Option Type known to the person skilled in the art) field with a length of one byte takes a value equal to 102 and thus indicates that this is a "mobility information" sub-option. An SOL (acronym for the expression Sub-Option Length known to the person skilled in the art) field with a length of one byte takes a value equal to 18 and thus announces the length of the sub-option in bytes without counting the first two fields. A MODE field with a length of one byte identifies the protocol used by the mobility server. A value of 0 will correspond to the Mobile IPv6 protocol, a value of 1 to the HMIPv6 protocol with Mobile IPv6 and a value of 2 to the HMIPv6 protocol without Mobile IPv6. A PLEN field with a length of one byte identifies the length of the network prefix of the mobility network. Finally, an MSAD (acronym of the expression Mobile Server ADress known to the person skilled in the art) address indicates an address of the mobility server.

The "Mobility Information" sub-option therefore contains the address of the mobility server as well as the length of the network prefix of the mobility network. The routers used may then backup these parameters in order to disseminate them in their router announcements thanks to an option ND6 called mobility information option.

Figure 9:
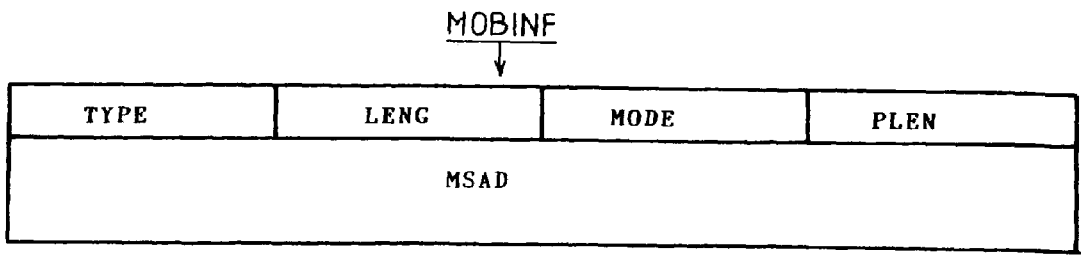
FIG. 9 depicts a structure of a mobility information option that conforms to HMIPv6 protocol.

FIG. 9 describes a structure MOBINF of a mobility information option ND6 that conforms to the HMIPv6 protocol, which includes in this example a TYPE field with a length of one byte, which takes a value equal to 100, a LENG field, with a length of one byte that takes a value equal to 20, a MODE field with a length of one byte that identifies the protocol used by the mobility server, a value of 0 corresponding to the Mobile IPv6 protocol, a value of 1 to the HMIPv6 protocol with Mobile IPv6 and a value of 2 to the HMIPv6 protocol without Mobile IPv6, and a PLEN field with a length of one byte that identifies the length of the network prefix of the mobility network. Finally an MSAD (acronym of Mobile Server ADress know to the person skilled in the art) address will indicate an address of the mobility server.

When a mobile node moves in a new HMIPv6 domain and detects the announcement of a new router with the mobility information option, it acquires two new temporary addresses. A first address is valid in the mobility network and is called the virtual address VCOA (acronym of the expression Virtual Care-Of Address known to the person skilled in the art). It is determined by concatenating the identifier of the interface of the mobile node with the mobility network prefix collected in the router announcement. A second address identifies the local link and is obtained by concatenating the identifier of the interface of the mobile node with the network prefix of the current base station and is called the local address LCOA (acronym of the expression Local Care-Of Address known to the person skilled in the art). The virtual address VCOA plays the role of primary temporary address. The mobile note must therefore inform its home agent, as well as any corresponding nodes outside the domain, of this temporary address using standard association update messages of the Mobile IPv6 protocol. Thus, all the packets sent to the mobile node from outside the domain will be routed to its address VCOA in the mobility network. Next, the mobility server must intercept these packets and deliver them to the LCOA address of the mobile node. However, for the mobility server to be able to deliver these packets, it must be informed of the correspondence of the LCOA and VCOA addresses. As soon as it acquires these two addresses, the mobile node informs the mobility network of the correspondence (LCOA, VCOA) by transmitting to it an HMIPv6 registration request packet. This registration request is an IPv6 packet with a new Route Update destination option header.

Figure 10:
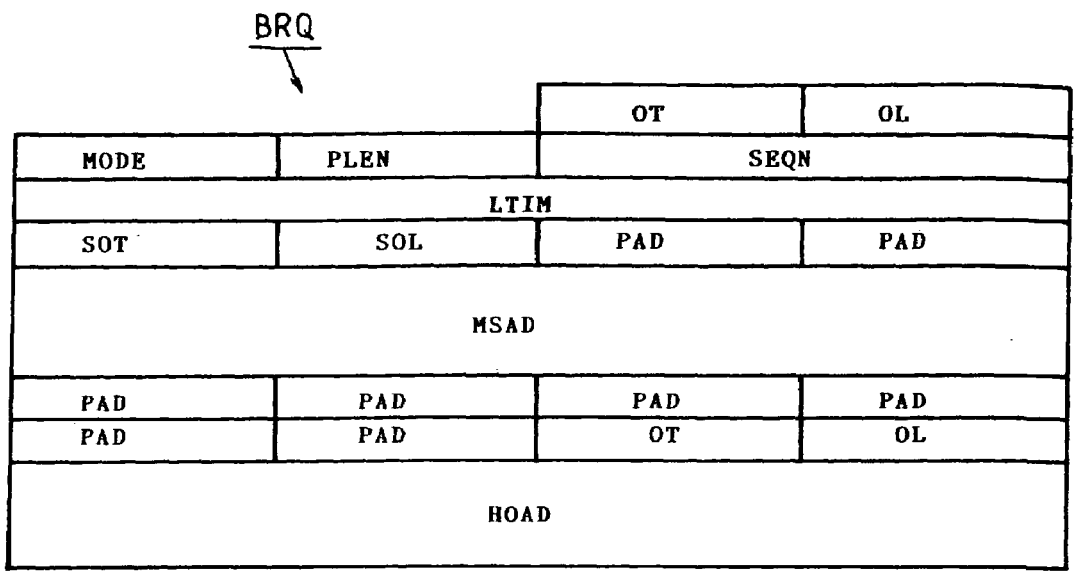
FIG. 10 is a schematic representation of a type of registration request header BRQ in accordance with HMIPv6 protocol.

FIG. 10 represents this type of registration request header BRQ in accordance with the HMIPv6 protocol. This header includes an OT field with a length of one byte that takes a value equal to 9 and thus indicates that the request is a route update request. An OL field with a length of one byte that takes a value equal to 32 announces the length of the option in bytes without counting the first two fields. A MODE field with a length of one byte identifies the protocol used by the mobility server, a value of 0 corresponding to the Mobile IPv6 protocol, a value of 1 to the HMIPv6 protocol with Mobile IPv6 and a value of 2 to the HMIPv6 protocol without Mobile IPv6. A PLEN field with a length of one byte identifies the length of the network prefix of the mobility network. This field may be initialized at zero since the mobility server does not need this information. A SEQN field (acronym of the expression SEQuence Number known to the person skilled in the art) with a length of two bytes will be used by the receiver node to sequence update messages and by the transmitter to associate the update messages with their acknowledgements (known to the person skilled in the art as Binding Acknowledgements). An LTIM field (acronym of the expression LifeTIMe known to the person skilled in the art) with a length of four bytes indicates the number of seconds remaining before the action of the last update message expires. An SOT field with a length of one byte takes a value equal to 102 and thus indicates that this involves a "Mobility Information" sub-option. An SOL field with a length of one byte takes a value equal to 22 and thus announces the length of the sub-option in bytes without counting the first two fields. An MSAD field with a length of sixteen bytes indicates the address of the old mobility server. If this is the first connection to the HMIPv6 domain, this field must be initialized at zero. An OT field with a length of one byte takes a value equal to 201 announcing a Home Address. An OL field with a length of one byte takes a value equal to 16 and thus announces the length of the option in bytes without counting the first two fields. Finally, an HOAD field identifies the Home Address of the mobile node. The registration request BRQ also contains a certain number of filling fields PAD with no value intended to adjust the length of the information packet constituted by said registration request BRQ to the standard length required by the IPv6 protocol.

As for any corresponding nodes within the domain, the mobile node must send them association update messages (known to the person skilled in the art as Binding Updates) in Mobile IPv6 format with its LCOA address as temporary address. Thus, the packets sent by these nodes to the mobile node will be delivered directly to its temporary local address. As long as the mobile node moves inside the domain visited, it retains its VCOA address and acquires only a new nLCOA address associated with the new local link. The mobile node must then inform any correspondents within the domain of its new nLCOA address, still thanks to registrations refreshments in Mobile IPv6 format.

Figure 11:
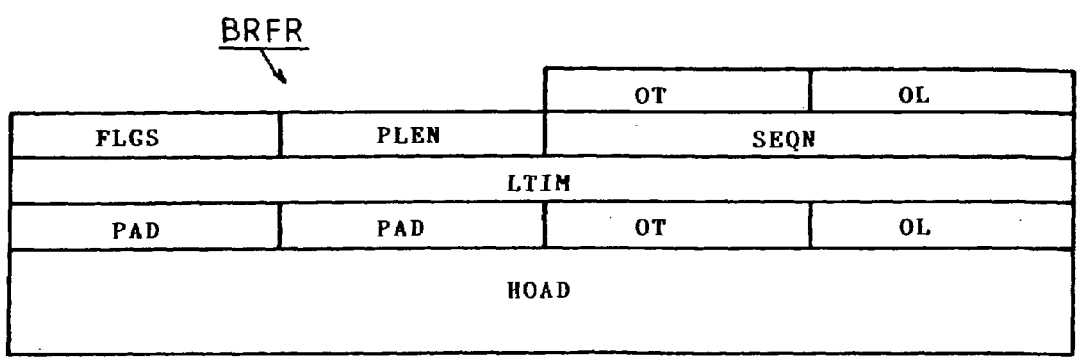
FIG. 11 depicts a structure of a BRFR registration refreshment packet that conforms to HMIPv6 protocol.

FIG. 11 describes the structure of a BRFR registration refreshment packet that conforms to the HMIPv6 protocol. This packet includes an OT field with a length of one byte that takes a value equal to 10 and thus indicates that the request is a binding update. An OL field with a length of one byte takes a value equal to 8 to announce the length of the option in bytes without counting the first two fields. An FLGS field with a length of one byte contains a set of flags and is initialized at one to indicated that this is an update. A PLEN field with a length of one byte identifies the length of the network prefix of the mobility network. This field may be initialized at zero since the mobility server does not need this information. A SEQN field with a length of two bytes will be used by the receiver node to sequence update messages and by the transmitter to associate the update messages with the acknowledgements received in return. An LTIM field with a length of four bytes indicates the number of seconds remaining before the action of the last update message expires. An OT field with a length of one byte takes a value equal to 201 announcing a Home Address. An OL field with a length of one byte takes a value equal to 16 and thus announces the length of the option in bytes without counting the first two fields. Finally, an HOAD field identifies the home address of the mobile node.

When a mobile node moves between two HMIPv6 domains, it changes its primary temporary address VCOA and the packets being transmitted sent to the old address VCOA will be lost. In order to limit these losses, the HMIPv6 protocol proposes another type of handover called Forward Handover. The forward handover operates as follows: the mobile node transmits an HMIPv6 registration request with the address of its old mobility server in the MSAD field. When receiving this request, the new mobility server detects [in?] the change in domain and address a forwarding request to the old mobility server specifying the new VCOA address. The forwarding request is a binding update message as described above, comprising a special FLGS field.

Figure 12:
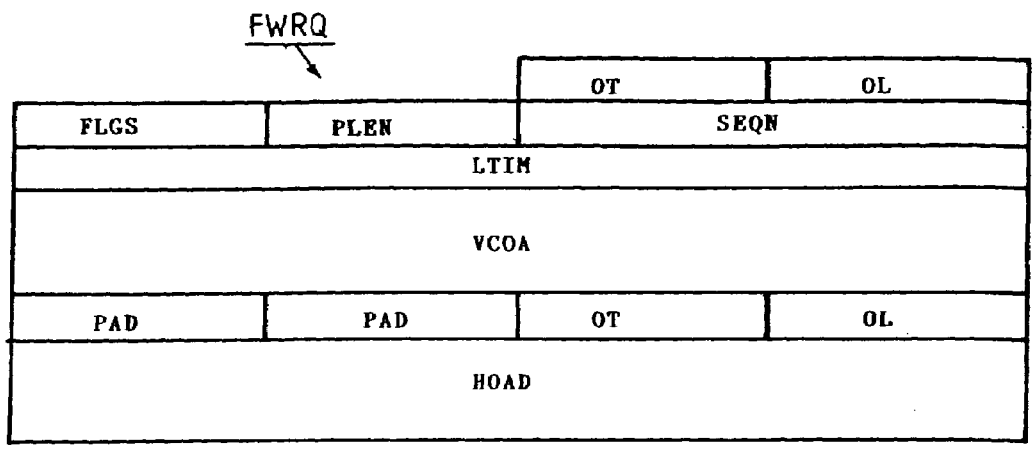
FIG. 12 depicts a structure of a Handover Request FWRQ that conforms to HMIPv6 protocol.

FIG. 12 describes the structure of a Handover Request FWRQ that conforms to the HMIPv6 protocol. This request comprises an OT field with a length of one byte that takes a value equal to 198 and thus indicates that the request is a binding update of a particular type. An OL field with a length of one byte takes a value equal to 24 to announce the length of the option in bytes without counting the first two fields. A FLGS field with a length of one byte is initialized at 0×22 (0×02 to indicate that this is a handover request and 0×20 to indicate that there is a field comprising the VCOA address of the mobile node just after the LTIM field). A PLEN field with a length of one byte identifies the length of the network prefix of the mobility network. This field will be initialized at zero at the time of transmission and ignored at the time of receipt. A SEQN field with a length of two bytes will be used by the receiver node to sequence the update messages and by the transmitter to associate the update messages with the acknowledgements received in return. The mobile node must use a larger number of sequences than the number of sequences used in the preceding update message sent to the same destination. An LTIM field with a length of four bytes indicates the number of seconds remaining before the action of the last update message expires. A VCOA field with a length of 16 bytes contains the new virtual address VCOA of the mobile node. An OT field with a length of one byte takes a value equal to 201 announcing a home address. An OL field with a length of one byte takes a value equal to 16 and thus announces the length of the option in bytes without counting the first two fields. Finally, an HOAD field identifies the home address of the mobile node.

Thus, the old mobility server, target of the forwarding request described above, forwards the packets intended for the old VCOA address to the new VCOA address, which limits the losses of packets being transmitted at the time the domain of the mobile node changes. When a mobile node returns to its home network, it must abandon these temporary addresses and operate without mobility agents. Furthermore, to avoid losing packets in the process of being transmitted when the domain changes, the mobile node sends a forwarding request as described above to its last mobility server so that this last server can forward the packets being transmitted to its home address.

Figure 13:
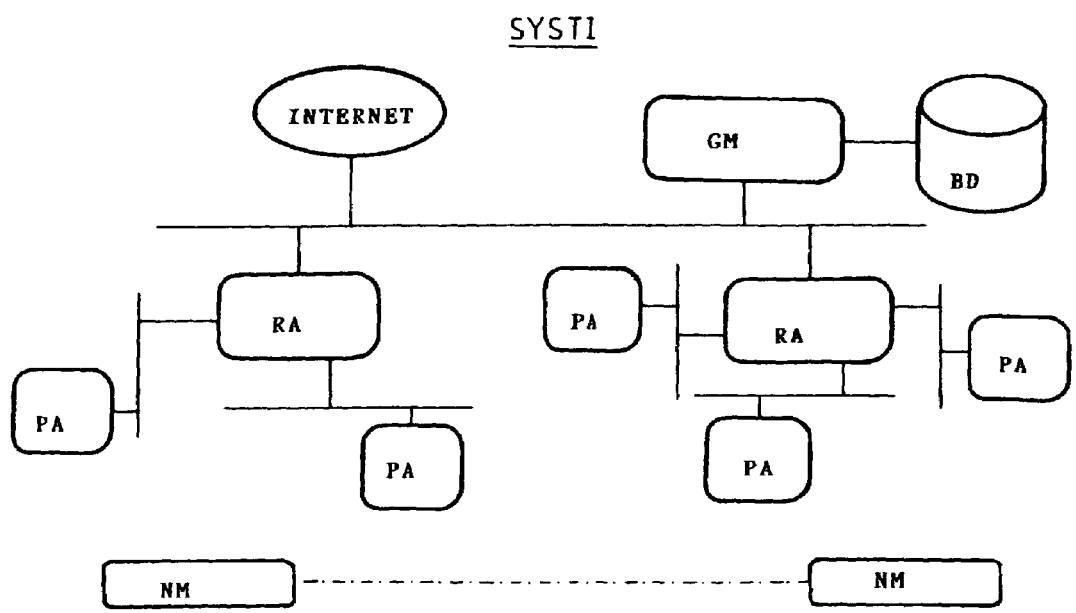
FIG. 13 is a schematic representation of a telecommunication system that uses a new protocol according to the invention.

FIG. 13 represents a telecommunication system SYSTI that uses a new protocol called NCHMIPv6 by its inventors, which means Network Controlled HMIPv6, which protocol exploits certain resources of the HMIPv6 protocol described earlier. This system SYSTI includes a Mobile IP Internet network and access routers RA for a mobile node NM to the IIv6 network. Access points PA ensure a radio link with the mobile node NM. A mobility manager GM plays an essential role in a decision-making process concerning a change in access point, called Handover, by the mobile node. Each access router RA is associated with a mobility manager GM. A database BD is associated with the mobility manager GM intended to host parameters useful for managing handovers as well as information concerning the access points PA that GM depend on the mobility manager. In a domain that supports the NCHMIPv6 protocol according to the invention, each access point PA is associated with an interface of an access router, depends on a mobility manager GM and has a set of neighboring access points. The list of neighboring access points is maintained in the database BD associated with the mobility manager GM, which database [GM] (sic) also maintains information useful for making decisions concerning the execution of handovers. An access point is identified by a single identifier (its cell name or its physical attachment address), the prefix of the interface of its associated access router and the length of this prefix. The mobility manager announces its support of the NCHMIPv6 protocol according to the invention by periodically disseminating to these access routers an information packet similar to the one of the HMIPv6 protocol with an additional MODE field indicating a "control by network" mode. In the implementation set forth here, a new value of the existing MODE field is defined for this purpose and initialized at 3 to identify the control by network mode. When a mobile node NM moves in a new domain that supports the NCHMIPv6 protocol according to the invention, it receives a routers announcement from its access router with a mobility server option similar to the one defined in the HMPIv6 protocol, also including a "control by network" MODE field. The mobile node NM acquires two temporary addresses similar to those described earlier in the case of the HMPIv6 protocol: a VCOA address at the level of the mobility manager and an LCOA address on its local link. Then, the mobile node NM registers the association (LCOA, VCOA) with its mobility manager by transmitting to it a registration request in HMIPv6 format and registers the association (VCOA, home address) with its Home Agent and its corresponding nodes using binding update messages in HMIPv6 format as described earlier. If the mobility manager GM accepts the new association, it must send a positive association acknowledgement (called Binding Acknowledgement) back to the mobile node NM and an information message containing the list of neighboring access points of its current access point. The mobility manager GM identifies the current access point through its access router. However, if the network allows two access points PA to be located in the same Ethernet strand, the mobile node NM must transmit the identity of its current access point in its registration request in order to allow the mobility manager GM to identify the access point with which the mobile node NM is associated. This is done by means of an information packet forming a registration request similar to the one described earlier in the context of the HMPIv6 protocol, also including a new sub-option called "access point information."

FIG. 14 is a schematic representation of a format that can be used by this type of information packet BRQI. An SOT field with a length of one byte is initialized at 103 and thus indicates that this is the new "access point information" sub-option. An SOL field with a length of one byte takes a value equal to 10 and thus announces the length of the sub-option in bytes without counting the first two fields. A PAID field with a length of one byte contains a numerical identifier of the access point allocated by the mobility manager. Once the mobile node is informed of the correspondence (PAID, PANM), it is this numerical identifier that must be used between the mobility manager and the mobile node to specify the corresponding access point. This makes it possible to reduce the size of the update packets since a numerical identifier (between 1 and 128) requires one byte while an 8-character name requires 8 bytes. A PREF field with a length of one byte indicates a use preference from a network perspective of the access point when the mobile node is forced to perform a handover without assistance from the network. A high value for this PREF field indicates that this access point is a preferential choice. If, on the other hand, an access point has a nil value PREF field, the mobile node must ignore this access point and eliminate it from its list if it already appears there. A PANM field with a length of 8 bytes indicates the name of the cell controlled by the access point. This PANM field represents the physical attachment parameter to the access point or of the cell managed by this access point. A mobile node that knows this parameter must be able to connect to the corresponding access point. In the mode of implementation of the invention described here, this PANM field corresponds to the name of the cell managed by the access point, but it may also represent the physical address of the radio link card of the access point, the Ethernet address of the access point or even the Ethernet address of the interface of the associated access router.

In a domain that supports the NCHMIPv6 protocol according to the invention, a mobile node continuously checks the quality of its radio link with its current access point. If this quality drops below a threshold S1, the mobile node takes communication quality measurements with the neighboring access points of its current access point and sends these measurements to its mobility manager in a handover request. The mobile node transmits in its handover request only the values of the quality measurements of the links with the neighboring access points included in its list of access point, as well as of its link with its current access point; the list of neighboring access points may have been updated with "access point information" packets described above sent by the mobility manager in a message acknowledging the registration request from the mobile node. The limitation to the access points included in the list of neighboring access points makes it possible to limit the size of the handover request thanks to a first selection made by the mobility manager. The handover request is an IPvt6 packet that also includes a new destination option called "handover request."

FIG. 15 is a schematic representation of a format that can be used by this type of information packet HVRQ. An OT field with a length of one byte takes a value equal to 11 and thus indicates that the request is a handover request. An OL field with a length of one byte announces the length of the option in bytes without counting the first two fields, which will be calculated as being equal to (12.N)+4.((N+1) modulo2), where N is the number of access points announced. If the number of access points is an even number, we must plan on four packing bytes with no value, for a destination option must always have a length that is a multiple of 8 bytes. A MODE field with a length of one byte is initialized at 3 to indicate a "control by network" mode in this mode of implementation of the invention. An NPA field with a length of one byte indicates the number of access points announced. This field is used essentially for guidance purposes, since the mobility manager does not need this information. A SEQN field with a length of two bytes will be used by the receiver node to sequence update messages and by the transmitter to associate the update messages with the acknowledgements received in return. An SOT field with a length of one byte takes a value equal to 110 and thus indicates that this is a new "access point measurement" sub-option. An SOL field with a length of one byte takes a value equal to 2 and thus announces the length of the sub-option in bytes without counting the first two fields. A PAID field with a length of one byte contains the numerical identifier of the access point. A QUAL field with a length of one byte contains a quality value embodied by the value of a signal-to-noise ratio measured for the radio link between the mobile node and the access point. An OT field with a length of one byte takes a value equal to 201 announcing a home address. An OL field with a length of one byte takes a value equal to 16 and thus announces the length of the option in bytes without counting the first two fields. Finally, an HOAD field identifies the home address of the mobile node.

The mobility manager will consult the measurements thus transmitted to it and will decide to which neighboring access point the mobile node must connect. The data manager may keep miscellaneous information in its database that may help it make decisions concerning the execution of the handover. For example, if it maintains information on the current load of its access points, the mobility manager may distribute the load. The mobility manager will return a reply to the handover request that will specify the access point chosen that is to constitute the new access point of the mobile node. At the same time, the mobility manager will create a new association (VCOA, nLCOA), nLCOA being the future address of the mobile node in association with the chosen access point, which makes it possible to duplicate data being transmitted to the mobile node in order to transmit said data simultaneously to the old and the new current access points.

Indeed, the new address can be predicted, since it is constructed using the concatenation of the network prefix of the new access router and the physical identifier of the interface of the mobile node, a construction that is sometimes called stateless configuration. The response from the mobility manager to a handover request is an IPv6 packet that also includes a new destination option called "handover response."

FIG. 16 is a schematic representation of a format that can be used by this type of information packet HVRT. An OT field with a length of one byte takes a value equal to 12 and thus indicates that the request is a handover response. An OL field with a length of one byte announces the length of the option in bytes without counting the first two fields, which will be chosen to equal 28. A MODE field with a length of one byte identifies the protocol used by the mobility manager. A NPA field with a length of one byte indicates the number of access points announced. This field is used essentially for guidance purposes, for the mobility manager does not need this information. A SEQN field with a length of two bytes will be used by the receiver node to sequence update messages and by the transmitter to associate the update messages with the acknowledgements received in return. In this mode of implementation of the invention an SOT field with a length of one byte takes a value equal to 114 and thus indicates that this is a new "chosen access point" sub-option. An SOL field with a length of one byte takes a value equal to 22 and thus announces the length of the sub-option in bytes without counting the first two fields. An ID field with a length of one byte contains the identifier of the chosen access point. A PLEN field with a length of one byte indicates the length of the access router prefix to which the chosen access point is connected. An RAAD field with a length of sixteen bytes identifies the address of the access router to which the chosen access point is connected.

After receiving the handover response described above, the mobile node will construct its future nLCOA address by concatenating its physical interface identifier with the network prefix of its future access network, and will execute its handover. As soon as it is connected to the new access point, the mobile node must transmit neighbor announcements in order to indicate its new correspondence (IP address nLCOA, link layer address). The mobile node must also transmit a router request to receive the router announcement from its new access router instantaneously. This makes it possible to reduce the dissemination frequency of router announcements in a network that supports the NCHMIPv6 protocol according to the invention and to consequently limit the overload of the radio links. If the router already has an input for the mobile node or data to transmit to it, the new access router receives the neighbors announcement of the mobile node with the future address nLCOA following which the router updates its routing table by making the IP nLCOA address correspond to the link layer address of the mobile node announced in the neighbors announcement, and the connection to the mobile node can then resume since the packets intended for the mobile node will have already been redirected by the mobility manager. Upon receipt of the routers announcement from its new access router, the mobile node completes and updates the parameters of its new nLCOA address such as the use life or the configuration flags. Then, the mobile node launches a time-out to depreciate then invalidate its old prefixes and its old default routers. If the mobile node has performed an intra-domain movement, the mobile node transmits a registration request to its mobility manager in order to update its association (VCO, nLCOA) previously created by the handover request, which makes it possible to interrupt the duplication of the data packets and their transmission to the old access point. If the mobile node has performed an inter-domains movement, the mobile node acquires, in addition to its physical address nLCOA, a new virtual address nVCOA and registers it with its new mobility manager and its corresponding nodes by transmitting to them respectively a new registration request and binding update messages in Mobile IP format. The mobile node must also depreciate, then invalidate its old virtual address. Upon receiving this request, the new mobility manager sends a special binding update message constituting a forwarding request that conforms to the HMIPv6 protocol to the old mobility manager so that this old mobility manager transmits the packets intended for the old address of the mobile node. The old mobility manager will then replace the old association (VCOA, nLCOA) with (VCOA, nVCOA). Whenever a mobile node moves and changes its access point, it must update its list of neighboring access points. It may do this in particular thanks to information packets concerning the access points disseminated by its mobility manager following a new registration. If the mobility manager wants to add a new neighboring access point, it must use the complete form of the option with the numerical identifier, the preference and the name. If the mobility manager wants to eliminate an access point from this list, it must use a reduced form of the option with the numerical identifier of the access point to be eliminated and a preference initialized at zero. If the mobility manager wants to update the preference of an access point present in the list of neighboring access points, it must use the reduced form with a new preference value. The use of the reduced form by the mobility manager to transmit information concerning access points already present on the list of neighboring access points in effect makes it possible to limit the size of the information packets used for this purpose.

FIGS. 17 to 20 illustrate the differences between handovers performed in a data transmission system using the known HMIPv6 protocol and in a data transmission system according to the invention using the new NCHMIPv6 protocol.

Figure 17:
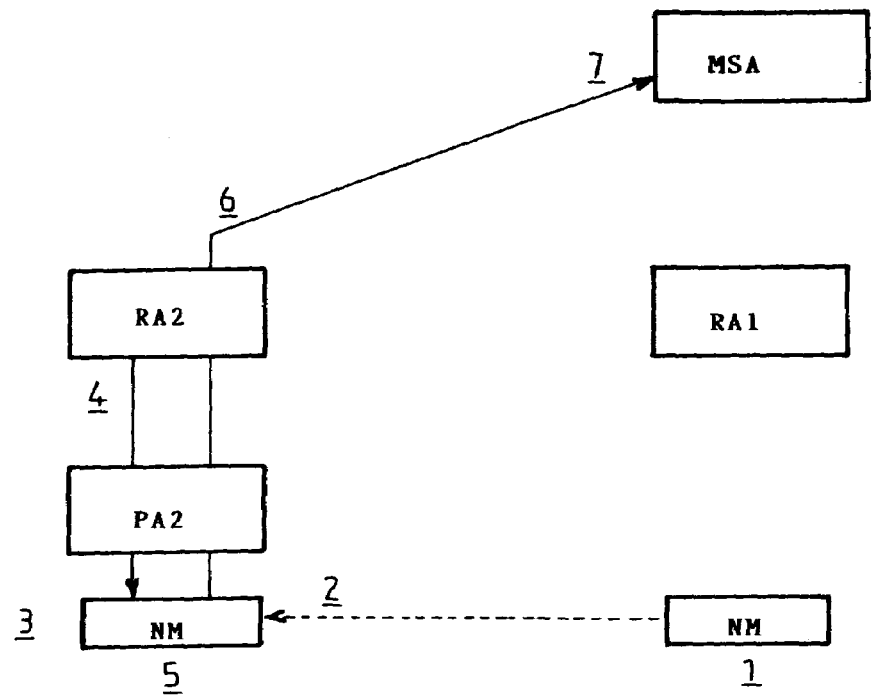
FIG. 17 depicts a transmission system using HMIPv6 protocol where a mobile node must perform an intra-domain handover.

FIG. 17 represents a transmission system using the HMIPv6 protocol in a scenario where a mobile node NM must perform an intra-domain handover, that is, within the same mobility domain. In step 1, the mobile node NM establishes a deterioration of the quality of the communication that it maintains with its current access point. In step 2, the mobile node NM proceeds with a radio handover to a new current access point PA2. In step 3, the mobile node NM waits for an available router announcement. In step 4, the mobile node NM receives a router announcement from an access router RA2. In step 5, the mobile node acquires a new address nLCOA. In step 6, the mobile node NM transmits to a mobility server MSA a registration request in MHIPv6 format. In step 7, data packets intended for the mobile node NM are redirected by said mobility server MSA to the address nLCOA.

Figure 18:
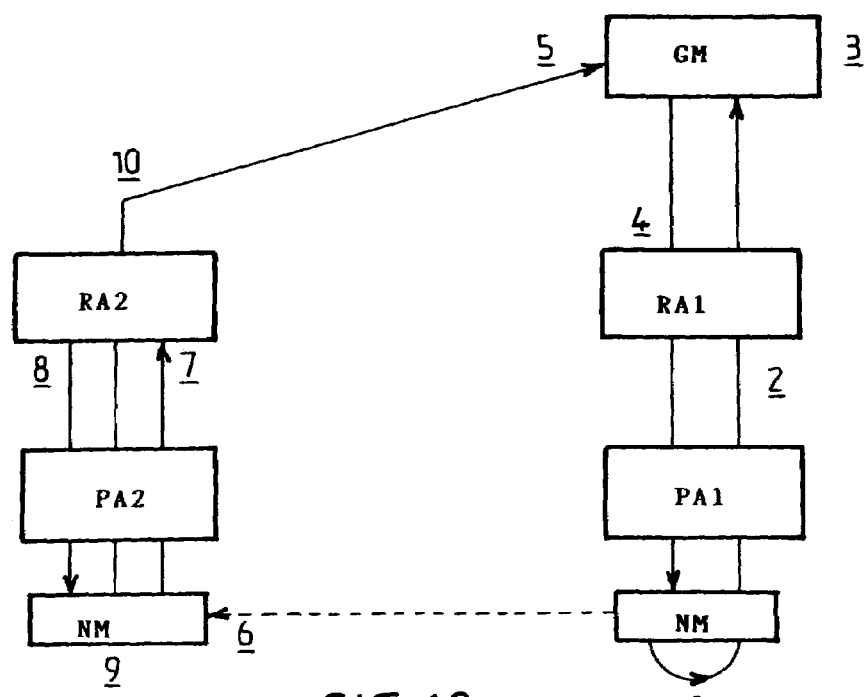
FIG. 18 depicts a transmission system using NCHMIPv6 protocol, according to the invention, where a mobile node must perform an intra-domain handover.

FIG. 18 represents a transmission system using the NCHMIPv6 protocol according to the invention in a similar scenario where the mobile node NM must perform an intra-domain handover. In step 1, the mobile node NM establishes a deterioration of the quality of the communication it maintains with its current access point PA1, made apparent by the fact that a measured value of said quality is lower than a value threshold S1. In step 2, the mobile node NM transmits a handover request to the mobility manager GM on which the current access point PA1 and the access router RA1 associated with the current access point depend.

In step 3, the mobility manager GM selects a target access router RA2. In step 4, the mobility manager GM sends the mobile node NM a response to its handover request that contains a new address nLCOA. In step 5, the mobility manager GM redirects the data packets intended for the mobile node NM to the new address nLCOA. In step 6, the mobile node NM acquires its new address nLCOA and executes the handover to the corresponding access point selected PA2. In step 7, the mobile node NM transmits to its new access router RA2 an announcement of neighbors of nLCOA and a request for a router announcement. In step 8, the access router RA2 transmits to the mobile node NM a routers announcement. In step 9, the mobile node NM updates the validity time and the new parameters. In step 10, the mobile node NM transmits to the mobility manager GM a registration request in HMIPv6 format.

Figure 19:
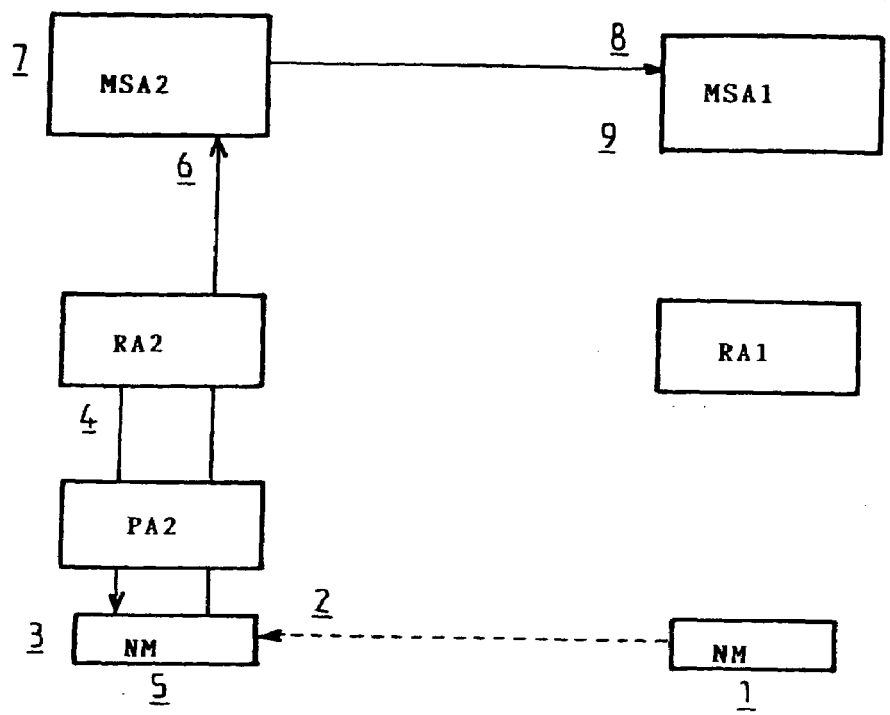
FIG. 19 depicts a transmission system using HMIPv6 protocol where a mobile node must perform an inter-domain handover.

FIG. 19 represents a transmission system using the HMIPv6 protocol in a scenario where the mobile node NM must perform an inter-domain handover, that is, from a first mobility domain managed by a first mobility server MSA1 to a second mobility domain managed by a second mobility server MSA2. In step 1, the mobile node NM establishes a deterioration of the quality of the communication it maintains with its current access point, which depends on the first mobility server MSA1. In step 2, the mobile node NM proceeds with a radio handover to a new current access point PA2 that depends on the second mobility server MSA2. In step 3, the mobile node NM waits for an available router announcement. In step 4, the mobile node NM receives a router announcement from an access router RA2. In step 5, the mobile node acquires two new addresses nLCOA and nVCOA. In step 6, the mobile node NM transmits a registration request in HMIPv6 format to the second mobility server MSA2. In step 7, data packets intended for the mobile node NM are redirected by the second mobility server MSA2 to the address nLCOA. In step 8, the second mobility server MSA2 transmits a forwarding request to the first mobility server MSA1. In step 9, data packets intended for the mobile node NM are redirected by the first mobility server MSA1 to the address nVCOA.

Figure 20:
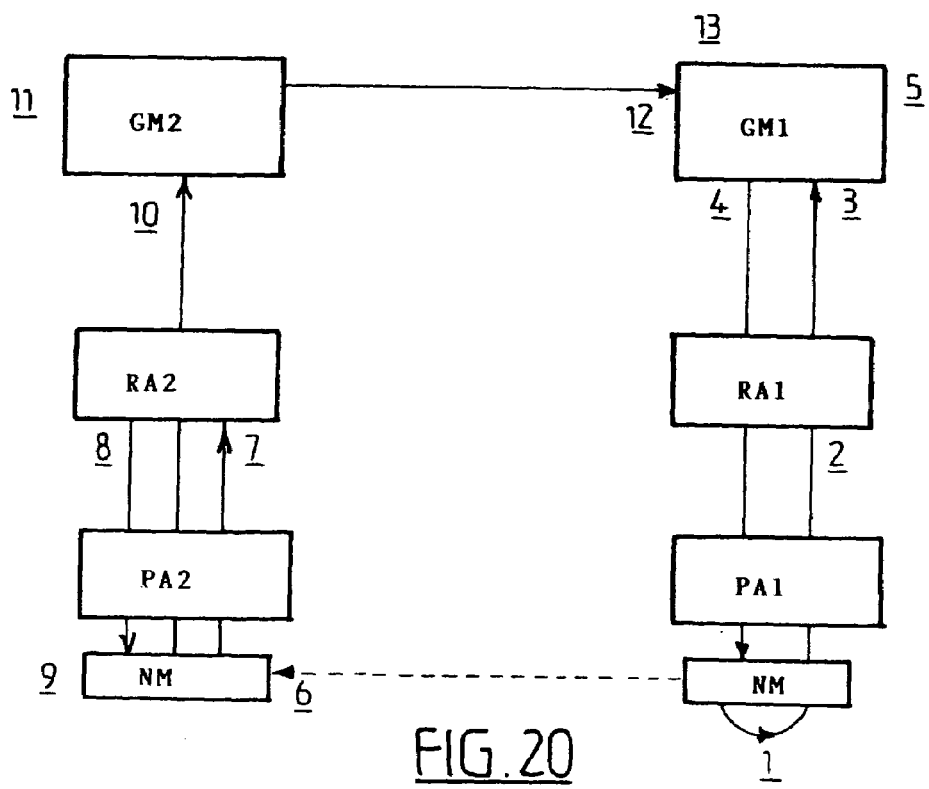
FIG. 20 depicts a transmission system using NCHMIPv6 protocol, according to the invention, where a mobile node must perform an inter-domain handover.

FIG. 20 represents a transmission system using the NCH-MIPv6 protocol according to the invention in a similar scenario where the mobile node NM must perform an inter-domain handover. In step 1, the mobile node NM establishes a deterioration of the quality of the communication it maintains with its current access point PA1, made apparent by the fact that a measured value of said quality falls below a threshold value S1. In step 2, the mobile node NM transmits a handover request to a first mobility manager GM1 on which the current access point PA1 and the access router RA1 associated with said current access point depend. In step 3, the first mobility manager GM1 selects a target access router RA2. In step 4, the first mobility manager GM1 sends the mobile node NM a response to its handover request that contains a new address nLCOA. In step 5, the first mobility manager GM1 redirects the data packets intended for the mobile node NM to the new address nLCOA. In step 6, the mobile node NM constructs its new address nLCOA and executes the handover to the corresponding chosen access point PA2. In step 7, the mobile node NM transmits to its new access router RA2 an nLCOA neighbors announcement and a request for a router announcement. In step 8, the access router RA2 transmits a router announcement to the mobile node NM. In step 9, the mobile node NM acquires a new address nVCOA. In step 10, the mobile node NM transmits a registration request in HMIPv6 format to the second mobility manager GM2 on which the new current access point PA2 and the access router RA2 associated with said new current access point depend. In step 11, data packets intended for the mobile node NM are redirected by the second mobility manager GM2 to the address nLCOA. In step 12, the second mobility manager GM2 transmits a forwarding request to the first mobility manager GM1. In step 13, data packets intended for the mobile node NM are redirected by the first mobility manager GM1 to the address nVCOA.

The rest of this appendix describes various variants of the modes of implementation of the invention described above:

In accordance with the preceding explanations, a mobile node that detects a deterioration of the quality of its radio link by establishing that a measurement of said quality is lower than a first threshold value S1 initiates a handover request and must, in principle, continue to retransmit said request until it receives a response in return from the mobility manager. According to one variant of the invention, if the quality measurement drops below a second threshold value S2, or if the number of handover requests transmitted without receiving any response exceeds a limit value, the mobile node may itself decide on and execute a handover without assistance by choosing a cell associated with a neighboring access point of its current access point offering the best communication quality and taking into account the preferences of the access points.

The first threshold value S1 can also be configured by the mobility manager depending on the particularity of the cell controlled by the current access point and the nature of the data flow transported, identified thanks to a field called "Flow Label" of the IPv6 header. Indeed, the mobility manager may at any time send an update message called "control threshold" comprising a threshold value to be used to control the quality of the radio link in progress. This update message will be an IPV6 packet including a new sub-option called "control threshold," and will include, for example, a first OT field called Control Threshold with a length of one byte that will indicate that the control threshold is intended to be configured by the mobility manager to which a value equal to 13 will be allocated, a second OL field with a length of one byte to which will be attributed a value equal to 2, which will announce the length of the option in bytes without counting the first two fields, and a third THRESHOLD field with a length of two bytes, that will determine the value of the control threshold chosen by the mobility manager. If the value of this third THRESHOLD field is nil, the mobile node must immediately trigger a handover procedure.

Thus, if the data flow being transmitted is such that it risks not tolerating the consequences of a handover, the mobility manager will choose a relatively low value for the first threshold value in order to delay the execution of a handover. Conversely, if the data flow being transmitted is such that it requires a high quality of service at the level of the radio link, the mobility manager will choose a relatively high value for the first threshold value.

A comparison of the mode of implementation of the invention described above with the known HMIPv6 protocol reveals the following essential differences:

In the known HMIPv6 protocol, a mobile node undergoes a handover of the radio card. In the protocol according to the invention, the mobile node controls the quality of the radio link it maintains with its current access point. If a measurement of this quality drops below a given threshold, the mobile node collects quality measurements of radio links that it might establish with neighboring access points of its current access point and delivers these measurements to the mobility manager, for example in a handover request. In the protocol according to the invention, the mobile node thus maintains a list of neighboring access points of its current access point, which is updated on the occasion of each handover thanks to information messages concerning the neighboring access points disseminated by the mobility manager.

Furthermore, concerning the mobility manager, it must be noted that in addition to fulfilling the functions of a mobility server conform to the known HMIPv6 protocol, a mobility manager that conforms to the NCHMIPv6 protocol according to the invention must control the decision-making process for executing a handover by the mobile nodes that depend on said mobility manager. Whenever it receives a handover request from one of these mobile nodes, the mobility manager analyzes the quality measurement results collected by said mobile node, consults the database associated with it and identifies a chosen access point to which the mobile node must connect. The mobility manager must then send a response to the handover request to the mobile node that transmitted it, anticipate the future address of said mobile node and duplicate and redirect the packets being transferred simultaneously to the old and to the new address of said mobile node. Finally, whenever a mobility manager accepts a registration request that conforms to the NCH-MIPv6 protocol according to the invention coming from a mobile node, the mobility manager must send in return to said mobile node an information packet concerning the neighboring access points of the current access point it has chosen for this mobile node in order to allow it to update its list of neighboring access points.

As presented previously, the invention may be implemented to manage selective accesses of mobile transmitters/receivers or mobile nodes to different access points, for example access points relating to different floors of one or more buildings housing the personnel of a company.

Each access point may thus be equipped with a unique identifier materialized by an SSID (Service Set IDentifier known to the person skilled in the art and defined in standard IEE 802.11) entered in the PANM field as described by FIG. 14.

The mobility manager will be capable of recognizing these identifiers and of associating with each of them geographic location information that may belong to one of the following categories:
  address,
  building reference, or
  building floor.

In a variant of this mode of implementation of the invention, the identifiers will be classified according to the categories described in a database provided for this purpose.

The mobility manager will also be able to recognize the profiles of the mobile transmitters/receivers it is intended to manage. A profile may restrict the access authorization of a given mobile transmitter/receiver to certain pre-determined access points:

Thus, for example, a first mobile transmitter/receiver equipped with a first address IP1 (entered in the HOAD field that identifies the home address of said mobile transmitter/receiver in accordance with the description of FIG. 10) will be equipped with authorizations authorizing it to connect to access points associated with a second floor of a first pre-determined building and with a third floor of a second pre-determined building. A second mobile transmitter/receiver equipped with a second address IP2 will be equipped with authorizations authorizing it to connect to access points associated with a third floor of the first pre-determined building and more generally, an Nth mobile transmitter/receiver equipped with a second address IPN will be equipped with authorizations authorizing it to connect to access points associated with floors X and Y of pre-determined buildings W and Z.

The different types of information described above (identifiers of access points and location information for access points) will advantageously be recorded in the mobility manager's database.

A mobile transmitter/receiver will register itself with the mobility manager via a current access point by transmitting a registration request as described previously, said request including more particularly a home address of the mobile transmitter/receiver. The mobility manager will then identify said mobile transmitter/receiver and will locate the corresponding profile in its database. The mobility manager will deduce from the profile the authorized access points for this mobile transmitter/receiver, for example those situated on a given floor of a pre-determined building, and, in association with current location information (known via the identification of the current access point, obtained at the time of the request), the mobility manager will establish a list of access points that are situated close to the mobile transmitter/receiver.

To illustrate this process with a simple example, in response to a request transmitted by a mobile transmitter/receiver situated in a given building, which request will include the IP address of said mobile transmitter/receiver and an identifier of the access point used, in this example an access point belonging to said building, the mobility manager will establish a list if identifiers of access points associated with one or more floors of said building.

The mobility manager will then transmit said list to the mobile transmitter/receiver, which will allow the mobile transmitter/receiver to identify the access point to which it could be authorized to connect.

In cases where several access points have the same identifier, the mobile transmitter/receiver may select one of these access points based on additional criteria, for example a criterion tied to the communication quality offered by the different access points.

The information transmitted by the mobility manager to the mobile transmitters/receivers may designate access points belonging to networks of different technologies, like, for example, second generation GSM radiotelephone networks, third generation UMTS radiotelephone networks, local wireless WLAN 802.11 networks or even GPRS networks. To this end, the list of authorized access points may contain, in addition to a first field including an identifier for each given access point included in the list, a second field including an identifier of the type of communication network with which said given access point is associated.

In accordance with the preceding description, the mobile transmitter/receiver will then be able to measure the quality of the communications it could establish with the authorized access points identified by means of the list described above.

The invention claimed is:

1. A wireless telecommunication system including:
  at least one mobile transmitter/receiver,
  a number of wireless access points, each of which is adapted for communicating with the mobile transmitter/receiver when said transmitter/receiver is situated in a coverage area of said access point,
  a communication network authorizing communications between said access points,
  a mobility manager adapted for identifying, based on operating conditions of the access points, a specific access point with which the mobile transmitter/receiver must establish said communication, the mobile transmitter/receiver being equipped with measuring means to take at least one measurement of a quality of communication it could establish with at least one neighboring point of a current access point with which said mobile transmitter/receiver is in the communication, said measuring means adapted for being activated only when the quality of the communication between the mobile transmitter/receiver and the current access point falls under a reference threshold value stored by the mobile transmitter/receiver, said reference threshold value being adjusted according to the following criteria:

the nature of the data flow transported by the communication established between the mobile transmitter/receiver and the current access point, the volume of communications in progress in the geographic area covered by said current access point, and a service quality required for the communication;

and wherein the wireless telecommunication system also includes a database associated with the mobility manager and intended to contain information relating to the operating conditions of the access points.

2. A wireless telecommunication system as claimed in claim 1, wherein the mobile transmitter/receiver is equipped with storage means intended to store, when it is in the communication with the current access point, a list of neighboring access points of the current access point, said list having been transmitted to it by the mobility manager.

3. A wireless telecommunication system as claimed in claim 1 wherein the mobile transmitter/receiver is equipped with means for sending a request, called a handover request, to the mobility manager for the purposes of entering into the communication with a neighboring access point of its current access point when the quality measurement has established that the communication with this neighboring access point would be of better quality than the communication with the current access point.

4. A wireless telecommunication system as claimed in claim 3 wherein as the handover request includes results of quality measurements taken by the mobile transmitter/receiver, the mobility manager is equipped with means for:
analyzing said results,
deducing from this analysis and from the operating conditions of the access points the identity of said specific neighboring access point with which the transmitter/receiver is to enter into the communication, and
transmitting said identity to said transmitter/receiver.

5. A wireless, telecommunication system as claimed in claim 1, wherein it also includes at least two interface devices between the access points and the communication network, each interface device being able to communicate with a pre-determined group of access points.

6. A telecommunication system as claimed in claim 5, wherein each access point is adapted to communicate only with single interface device.

7. A wireless telecommunication system as claimed in claim 5, wherein the mobility manager is installed in at least one interface device.

8. A data transmission method in a wireless telecommunication system including:
at least one mobile transmitter/receiver,
a number of access points, each of which is capable of communicating with the mobile transmitter/receiver when said transmitter/receiver is situated in a coverage area of said access point,
a communication network authorizing communications between said access points,
said method including at least one identification step by a mobility manager, based on operating conditions of the access points, of a specific access point with which the mobile transmitter/receiver must establish said communication, said method further including a quality measuring step, executed by the mobile transmitter/receiver, of said communication it could establish with at least one neighboring point of a current access point with which said mobile transmitter/receiver is in communication, the quality measuring step being executed only when the quality of the communication between the mobile transmitter/receiver and the access point falls below a predetermined threshold value stored by the mobile transmitter/receiver, said predetermined reference threshold value, being adjusted according to the following criteria:

the nature of the data flow transported by the communication established between the mobile transmitter/receiver and the current access point, the volume of communications in progress in the geographic area covered by said current access point, and a service quality required for the communication;

and wherein the wireless telecommunication system also includes a database associated with the mobility manager and intended to contain information relating to the operating conditions of the access points.

9. A data transmission method as claimed in claim 8, wherein it includes a step in which when it is in the communication with the current access point the mobile transmitter/receiver stores of a list of neighboring access points of the current access point, which list was transmitted to it by the mobility manager.

10. A data transmission method as claimed in claim 9, wherein it also includes a step in which the mobility manager creates a list of neighboring access points, which list is established based on environmental information specific to the mobile transmitter/receiver for which said list is intended.

11. A data transmission method as claimed in claim 10, wherein the environmental information specific to the mobile transmitter/receiver is particularly representative of profiles that conform to the following list:
membership of a user of the transmitter/receiver in a pre-determined group of users, and access authorization to at least one pre-determined access point granted to said group,
prior acquisition by the user of authorizations to communicate with different access points linked to communication networks of different kinds, or
geographic location of a user of the transmitter/receiver in a pre-determined area and access authorization to at least one pre-determined access point reserved for said zone.

12. A data transmission method as claimed in claim 8, wherein it also includes a step for transmitting handover request by the mobile transmitter/receiver to the mobility manager for the purposes of establishing a communication of said transmitter/receiver with a neighboring access point of its current access point when a quality measurement has established that a communication with this neighboring access point would be of better quality than the communication with the current access point.

13. A data transmission method as claimed in claim 12, wherein as the handover request includes results of quality measurements taken by the mobile transmitter/receiver, the identification step includes, to be executed by the mobility manager:
- a sub-step for analyzing said results,
- a sub-step for deducing from this analysis and from the operating conditions of the access points the identity of said specific neighboring access point with which the transmitter/receiver is to enter into the communication, and
- a sub-step for transmitting said identity to said mobile transmitter/receiver.

14. A telecommunication system as claimed in claim 1, wherein a new predetermined reference threshold value is transmitted by the mobility manager to the mobile transmitter/receiver when a new specific access point has been identified by the mobility manager.

* * * * *